(12) United States Patent
Desserrey et al.

(10) Patent No.: US 12,111,746 B2
(45) Date of Patent: Oct. 8, 2024

(54) ACCESSING THIRD PARTY RESOURCES VIA CLIENT APPLICATION WITH MESSAGING CAPABILITY

(71) Applicant: Snap Inc., Santa Monica, CA (US)

(72) Inventors: Laurent Desserrey, Los Angeles, CA (US); Dylan Shane Eirinberg, Venice, CA (US); Matthew Colin Grantham, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/566,062

(22) Filed: Dec. 30, 2021

(65) Prior Publication Data

US 2022/0206924 A1    Jun. 30, 2022

Related U.S. Application Data

(60) Provisional application No. 63/133,194, filed on Dec. 31, 2020.

(51) Int. Cl.
| | | |
|---|---|---|
| *G06F 11/34* | (2006.01) | |
| *G06F 3/00* | (2006.01) | |
| *G06F 3/04842* | (2022.01) | |
| *G06F 9/451* | (2018.01) | |

(Continued)

(52) U.S. Cl.
CPC .......... *G06F 11/3438* (2013.01); *G06F 3/005* (2013.01); *G06F 3/04842* (2013.01); *G06F 9/451* (2018.02); *G06F 16/9577* (2019.01); *G06F 18/22* (2023.01)

(58) Field of Classification Search
CPC .. G06F 11/3438; G06F 9/451; G06F 16/9577; G06F 18/22; G06F 3/005; G06F 3/04842
See application file for complete search history.

(56) References Cited

U.S. PATENT DOCUMENTS

| | | | |
|---|---|---|---|
| 9,449,181 B1 * | 9/2016 | Umapathy | ............ H04L 63/102 |
| 9,484,046 B2 * | 11/2016 | Knudson | ................. G10L 25/48 |
| 9,836,205 B2 * | 12/2017 | Balakrishnan | ........ G06F 3/0482 |

(Continued)

FOREIGN PATENT DOCUMENTS

| | | |
|---|---|---|
| CN | 116802609 A | 9/2023 |
| WO | WO-2022147282 A1 | 7/2022 |

OTHER PUBLICATIONS

"International Application Serial No. PCT/US2021/065728, International Search Report mailed Jun. 3, 2022", 7 pgs.

(Continued)

*Primary Examiner* — Beau D Spratt
(74) *Attorney, Agent, or Firm* — Schwegman Lundberg & Woessner, P.A.

(57) ABSTRACT

In one or more implementations, a user interface is displayed that includes user interface elements that correspond to third-party application resources that are executable within a client application. The user interface elements may be selectable to launch the third-party application resources within the client application. The user interface may be accessed from a camera user interface of the client application and the user interface may also have a region that includes a portion of the camera user interface in addition to the user interface elements that correspond to the third-party application resources.

20 Claims, 13 Drawing Sheets

(51) Int. Cl.
*G06F 16/957* (2019.01)
*G06F 18/22* (2023.01)

(56) References Cited

U.S. PATENT DOCUMENTS

| | | | |
|---|---|---|---|
| 11,054,973 B1* | 7/2021 | Manzari | G06F 3/04847 |
| 2014/0365912 A1 | 12/2014 | Shaw et al. | |
| 2015/0058754 A1* | 2/2015 | Rauh | H04N 1/00 715/753 |
| 2016/0284123 A1* | 9/2016 | Hare | G06V 40/167 |
| 2017/0013292 A1 | 1/2017 | Choi et al. | |
| 2018/0191797 A1* | 7/2018 | Javier | H04W 4/025 |
| 2018/0295079 A1* | 10/2018 | Longo | H04L 51/10 |
| 2018/0300916 A1* | 10/2018 | Barnett | G06F 3/04883 |
| 2019/0095436 A1* | 3/2019 | Martinazzi | G06F 16/951 |
| 2019/0347181 A1* | 11/2019 | Cranfill | G06F 11/3013 |
| 2020/0382724 A1* | 12/2020 | Pena | H04N 23/69 |
| 2021/0303855 A1* | 9/2021 | Anvaripour | G06F 3/04845 |

OTHER PUBLICATIONS

"International Application Serial No. PCT/US2021/065728, Invitation to Pay Additional Fees mailed Apr. 13, 2022", 12 pgs.

"International Application Serial No. PCT/US2021/065728, Written Opinion mailed Jun. 3, 2022", 11 pgs.

Halter, Hallei, et al., "How to Customize Your iPhone Share Menus", [Online] Retrieved from the Internet: <URL:https://web.archive.org/web/20201210234232/https://www.iphonelife.com/content/how-to-rearrange-app-icons-share-tab> [retrieved on Apr. 5, 2022], (Dec. 10, 2020), 18 pgs.

Pathak, Khamosh, "How to Customize the Share Sheet on Your iPhone or iPad", [Online] Retrieved from the Internet: <URL:https://www.howtogeek.com/441878/how-to-customize-the-sharesheet-on-your-phone-or-ipad/> [retrieved on Apr. 5, 2022], (Oct. 4, 2019), 12 pgs.

Peterson, Jake, "How to Add, Remove & Reorder the Share Sheet Options on Your iPhone IOS & iPhone :: Gadget Hacks", [Online] Retrieved from the Internet: <URL:https://ios.gadgethacks.com/how-to/add-remove-reorder-share-sheetoptions-your-iphone-0155436/> [retrieved on Apr. 5, 2022], (Nov. 15, 2019), 8 pgs.

"International Application Serial No. PCT/US2021/065728, International Preliminary Report on Patentability mailed Jul. 13, 2023", 13 pgs.

* cited by examiner

ACCESSING THIRD PARTY RESOURCES VIA CLIENT APPLICATION WITH MESSAGING CAPABILITY

CROSS-REFERENCE TO RELATED APPLICATION

This patent application claims the benefit of U.S. Provisional Application Ser. No. 63/133,194, filed on Dec. 31, 2021, which is incorporated by reference herein in its entirety.

BACKGROUND

Applications executed by client devices may be used to generate content. For example, client applications may be used to generate messaging content, image content, video content, audio content, media overlays, documents, creative works, combinations thereof, and the like. In various situations, user content may be modified by augmented reality content and shared with one or more additional users.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
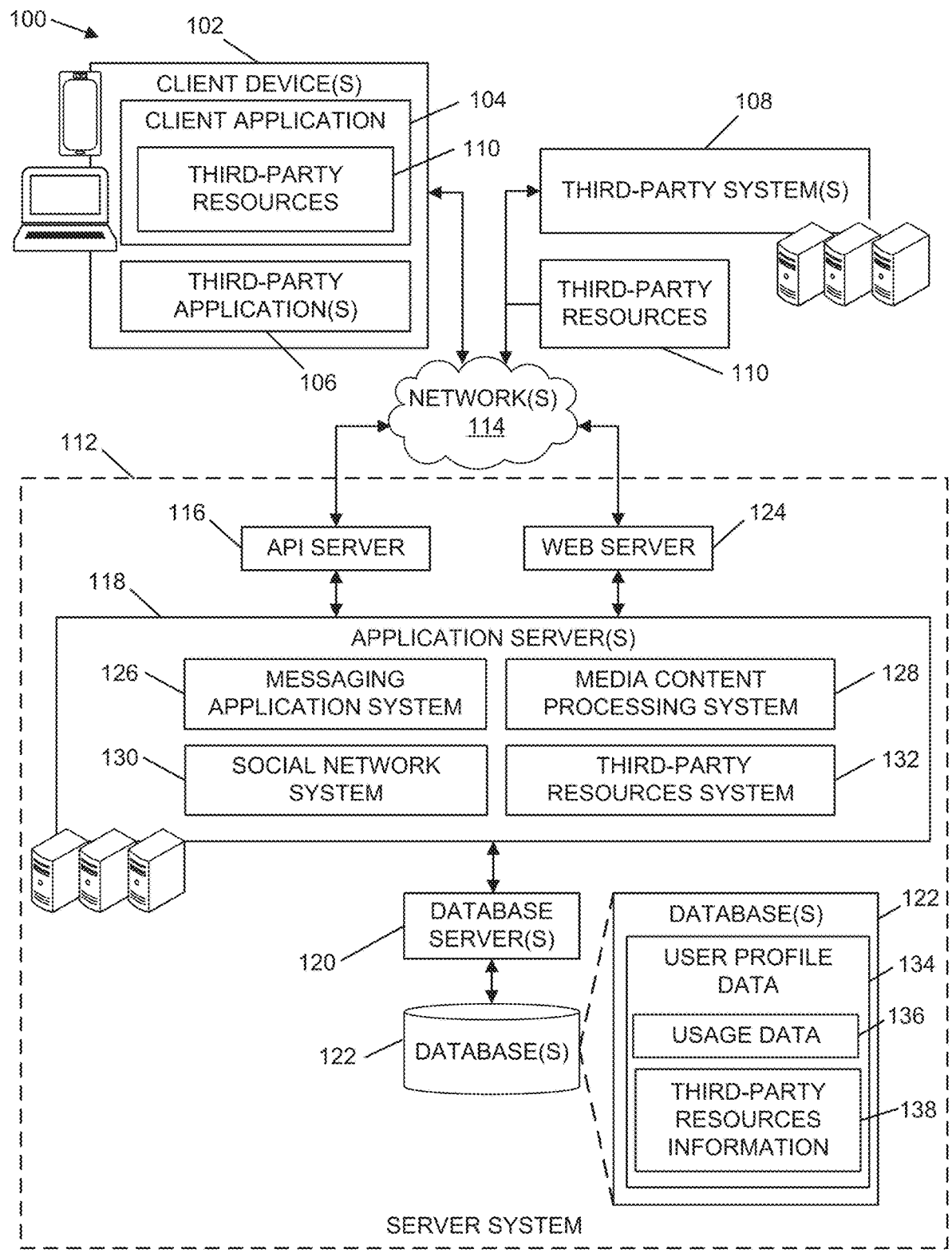
FIG. 1 is a diagrammatic representation of an architecture for exchanging data (e.g., messages and associated content) over a network, according to one or more example implementations.

Applications that are executable by a computing device, such as a mobile computing device, a smart phone, a tablet computing device, a laptop computing device, a portable gaming device, and the like, may provide various types of functionality For example, applications may be executable to provide games, to communicate with others, to conduct financial transactions, to access content made available by one or more content providers, to create content (e.g., text content, audio content, video content), and so forth. In various scenarios, these applications may be referred to as "apps." In existing systems, computer-readable instructions that correspond to the applications are downloaded and stored in memory of a computing device and users access the functionality of the applications by launching an instance of the application.

Typically, as an increasing number of applications are downloaded onto computing devices, the amount of memory available for additional applications is reduced. As memory capacity reaches a limit, applications may be deleted from the computing device in order to make sufficient memory space available for new applications to be added. This may be an undesirable situation for many users that lose at least one of functionality or content when an application is removed from a computing device. In addition, computational efficiency and processing times are also detrimentally impacted as an increasing number of applications are downloaded to a computing device.

Further, computing devices that have a relatively smaller computational and storage footprint, such as mobile computing devices, accessing the functionality of multiple applications concurrently is not possible or inefficient. To illustrate, a user may launch an instance of a first application and utilize functionality of the first application. In various scenarios, the user may also want to access functionality of a second application while using the first application. In these situations, the user typically exits the first application and launches an instance of the second application. The user may then utilize functionality of the second application, such as to generate content, obtain information, and the like. The user may proceed to exit the second application and return to the first application to implement the results of the functionality of the second application with respect to the first application. In an illustrative example, a user may be utilizing messaging or social networking functionality of a first application and decide to attend a movie with friends. In existing systems, in order to purchase movie tickets with friends, the user exits the first application and launches a second application to view available movie tickets. The user then exits the second application and returns to the first application after obtaining information related to the movie ticket availability. Within the first application, the user may communicate with friends based on the movie ticket availability and proceed to exit the first application and return to the second application to purchase the movie tickets. These scenarios are inefficient, time consuming, and are often frustrating to users.

The systems, methods, techniques, instruction sequences, and computing machine program products described herein are directed to resources that may be launched within an instance of a client application to access a set of features that are not natively accessible in the client application. The resources may be provided by a third-party that is not involved in the development, maintenance, or administration of the client application. In one or more examples, the third-party resources may be accessible without downloading computer-readable instructions to non-volatile memory of the computing device. In one or more illustrative examples, the third-party resources may utilize one or more markup language documents to provide one or more capabilities within the client application. For example, the third-party resources may utilize one or more hypertext markup language (HTML) documents to provide one or more capabilities within the client application.

In various implementations, the third-party resources may correspond to a subset of features available in a conventional version of an application or a smaller-scale version of a conventional version of the application. In one or more additional implementations, the third-party resources may correspond to features that are not available in relation to a conventional version of an application. In one or more illustrative examples, a user may cause a client device to launch a client application that includes messaging capabilities and the user may exchange messages with friends in relation to purchasing movie tickets. The user and friends may access a third-party resource within the client application that enables the group to continue messaging while deciding on a movie to watch, selecting seats in a theater, and purchasing tickets to the movie. In this way, the functionality available to users outside of the client application may be accessed within the client application resulting in a more efficient and more user-friendly experience for users. Additionally, by enabling access to third-party resources within client applications, memory space on computing devices is maximized and is not dedicated to storing computer-readable instructions of various applications that have overlapping features with the third-party resources. Further, by decreasing the amount of memory allocated to storing computer-readable instructions of client applications and decreasing the processing resources dedicated to executing the client applications, the functioning of computing devices is improved.

The systems, methods, techniques, instruction sequences, and computing machine program products described herein are also directed to one or more user interfaces to access third-party resources that are accessible within a client application having messaging capabilities. In one or more examples, third-party resources may be accessed via a camera user interface of the client application, where the camera user interface includes a view of one or more cameras of a client device. The camera user interface may be used to generate content that is captured via the camera user interface, such as at least one of image content or video content. In various examples, user input may be received via the camera user interface to access an additional user interface that provides access to third-party resources. In one or more illustrative examples, user input indicating a swipe down in the camera user interface may launch an additional user interface that includes one or more user interface elements that are individually selectable to launch a third-party resource within the client application.

In one or more implementations, the third-party resources user interface may include one or more regions that include icons that correspond to individual third-party resources. In addition, the additional user interface may include a region that includes a partial view of the camera user interface. In this way, at least a portion of the camera user interface is displayed in addition to user interface elements of third-party resources. Further, by displaying at least a portion of the camera user interface within the third-party resources user interface, the camera user interface is easily accessible from the third-party resources interface. In one or more scenarios, user interface elements of the third-party resources may be arranged according to a usage history of the third-party resources by individual users. As a result, the display of user interface elements that correspond to third-party resources may be customized for individual users of the client application. Additionally, the third-party resources user interface provides a dedicated user interface to view, manage, and launch third-party resources that is not present in existing systems.

FIG. 1 is a diagrammatic representation of an architecture 100 for exchanging data (e.g., messages and associated content) over a network. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including a client application 104 and one or more third-party applications 106. A user may use the client application 104 to create content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth. The client application 104 and the one or more third-party applications 106 may be native applications that are downloaded and installed on the client device 102.

One or more users may be a person, a machine, or other means of interacting with a client device, such as the client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

The architecture 100 may also include one or more third-party systems 108. The one or more third-party systems 108 may provide third-party resources 110 that are accessible within the client application 104, in one or more examples, the third-party resources 110 may be sent directly from the one or more third-party systems 108 client devices 102, In one or more additional examples, the third-party resources 110 may be routed to the client devices 102 via a server system 112. For example, the one or more third-party systems 108 may send the third-party resources 110 to the server system 112 and the server system 112 may send the third-party resources 110 to the client applications 102 in response to requests sent by the client devices 102 to the server system 112 related to the third-party resources 110, In various examples, the server system 112 may modify the third-party resources 110 before sending the third-party resources 110 to the client devices 102. In one or more implementations, the server system 112 may add at least one of content or computational utilities to the third-party resources 110 before sending the third-party resources 110 to the client devices 102. In one or more further examples, the one or more third-party systems 108 may at least one of provide, create, maintain, manage, or administer the third-party application 106.

The third-party resources 110 may be a small-scale version of a third-party application 106, in at least some implementations. For example, the third-party resources 110 may implement a subset of features of the third-party application 106. In one or more examples, the third-party resources 110 may implement features that are not related to a third-party application 106. In various examples, the third-party resources 110 may be implemented using one or more markup language documents obtained from the one or more third-party systems 108. In addition to using markup-language documents (e.g., a.*ml file), the one or more third-party systems 108 may incorporate at least one of a scripting language (e.g., a.*js file or a.j son file) or a style sheet (e.g., a.*ss file). In one or more illustrative examples, the third-party resources 110 may be web-based resources that are implemented within the client application 104. In one or more additional illustrative examples, the third-party resources 110 may include games that are accessible within the client application 104.

In one or more illustrative examples, the client application 102 may receive input to launch one or more third-party resources 110 or to launch features or utilities related to one or more third-party resources 110. The client application 104 may determine that the one or more third-party resources 110 being launched include web-based external resources. In one various examples, the client application 102 may request one or more third-party resources 110 from at least one of the one or more third-party systems 108 or the server system 112. For example, user input may be received at the client device 102 from within the client application 104 that corresponds to a request for the one or more third-party resources 110. To illustrate, the client device 102 may receive input indicating selection of a user interface element displayed within a user interface that is displayed in association with the client application 104. In response to the request, at least one of the one or more third-party systems 108 or the server system 112 may send at least one third-party resource 110 that includes one or more markup-language documents. The one or more markup-language documents may be processed by the client device 102 to provide at least one of features, utilities, or content that correspond to the one or more requested third-party resources 110 within the client application 104, The client application 104 may notify a user of the client device 102, or other users related to such a user (e.g., "friends"), of activity taking place with respect to one or more third-party resources 110, For example, the client application 104 may provide participants in a messaging conversation (e.g., a chat session) taking place within the client application 104 with notifications relating to the current or recent use of an third-party resource 110 by one or more members of a group of users. One or more users may be invited to join in an active session of a third-party resource 110 in which the group of users is participating. In one or more additional examples, one or more users may also be invited to launch a session of the third-party resource 110 with respect to the group of users. The third-party resources 110 may provide participants in a messaging conversation, taking place within the client application 104, with the ability to share an item, status, state, or location with one or more additional participants in the messaging conversation. The shared item may be an interactive chat card with which members of the chat may interact, for example, to launch the corresponding third-party resource 110, view specific information within the third-party resource 110, or to cause a participant in the messaging conversation to a specific location or state within the third-party resource 110. Within a given third-party resource 110, response messages may be sent to users within the client application 104. The third-party resource 110 may also selectively include different media items in the response messages.

Each instance of the client application 104 is able to communicate and exchange data with at least one of another instance of the client application 104, one or more third-party applications 106, or the server system 112. The data exchanged between instances of the client applications 104, between the third-party applications 106, between instances of the client application 104 and the third-party application 106, and between instances of the client application 104 and the server system 112 includes functions (e.g., commands to invoke functions) and payload data (e.g., text, audio, image, video, or other multimedia data). Data exchanged between instances of the client applications 104, between the third-party applications 106, and between at least one instance of the client application 104 and at least one third-party application 106 may be exchanged directly from an instance of an application executed by a client device 102 and an instance of an application executed by an additional client device 102. Further, data exchanged between the client applications 104, between the third-party applications 106, and between at least one client application 104 and at least one third-party application 106 may be communicated indirectly (e.g., via one or more intermediate servers) from an instance of an application executed by a client device 102 to another instance of an application executed by an additional client device 102. In one or more illustrative examples, the one or more intermediate servers used in indirect communications between applications may be included in the server system 112.

The third-party application(s) 106 may be separate and distinct from the client application 104, The third-party application(s) 106 may be downloaded and installed by the client device 102 separately from the client application 104. In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In one or more implementations, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 112 provides server-side functionality via one or more networks 114 to the client application 104. The server system 112 may be a cloud computing environment, according to some example implementations. For example, the server system 112, and one or more servers associated with the server system 112, may be associated with a cloud-based application, in one illustrative example. In one or more implementations, the client device 102 and the server system 112 may be coupled via the one or more networks 114.

The server system 112 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples, Data exchanges within the architecture 100 are invoked and controlled through functions available via user interfaces (Uls) of the client application 104. The server system 112 may be at least one of implemented or maintained by a service provider that provides one or more services via the client application 104. The one or more services may be related to social networking, messaging, content creation, content consumption, online retail, or one or more combinations thereof.

While certain functions of the architecture 100 are described herein as being performed by either a client application 104 or by the server system 112, the location of functionality either within the client application 104 or the server system 112 is a design choice. For example, it may be technically preferable to initially deploy certain technology and functionality within the server system 112, but to later migrate this technology and functionality to the client application 104 where a client device 102 has a sufficient processing capacity.

The server system 112 includes an Application Programming Interface (API) server 116 that is coupled to, and provides a programmatic interface to, an application server 118. The application server 118 is communicatively coupled to a database server 120 that facilitates access to one or more databases 122. The one or more databases 122 may store data associated with information processed by the application server 118, The one or more databases 122 may be storage devices that store information such as untreated media content, original media content from users (e.g., high-quality media content), processed media content (e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 122 may further store information related to third-party servers, client devices 102, client applications 104, users, third-party applications 106, and so forth.

The API server 116 receives and transmits data (e.g., commands and message payloads) between at least one of client devices 102 or developer devices 108 and the application server 11$. Specifically, the Application Program interface (API) server 116 provides a set of interfaces (e.g., routines and protocols) that can be called or queried by the client application 104 in order to invoke functionality of the application server 11$. The Application Program Interface (API) server 116 exposes various functions supported by the application server 118, including account registration, login functionality, the sending of messages, via the application server 118 from one instance of the client application 104 to another instance of the client application 104, the sending of media files (e.g., images, audio, video) from a client application 104 to the application server 118, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104), The API server 116 may also provide access by developer devices 108 to frameworks that may be used to modify or customize a camera user interface in relation to content corresponding to third-party applications 106.

The server system 112 may also include a web server 124. The web server 124 is coupled to the application servers 118, and provides web-based interfaces to the application servers 118. To this end, the web server 124 processes incoming network requests over the Hypertext Transfer Protocol (HTTP) and several other related protocols.

The application server 118 hosts a number of applications and subsystems, including a messaging application system 126, a media content processing system 128, a social network system 130, and a third-party resources system 132. The messaging application system 126 implements a number of message processing technologies and functions, particularly related to the aggregation and other processing of content (e.g., textual and multimedia content) included in messages received from multiple instances of the client application 104. For example, the messaging application system 126 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 126 may aggregate text and media content from multiple sources into collections of content. These collections are then made available, by the messaging application system 126, to the client application 104. Other processor- and memory-intensive processing of data may also be performed server-side by the messaging application system 126, in view of the hardware requirements for such processing.

The media content processing system 128 is dedicated to performing various media content processing operations, typically with respect to images, audio, or video received within the payload of a message or other content item at the messaging application system 126. The media content processing system 128 may access one or more data storages (e.g., the database(s) 122) to retrieve stored data to use in processing media content and to store results of processed media content.

The social network system 130 supports various social networking functions and services, and makes these functions and services available to the messaging application system 126. To this end, the social network system 130 maintains and accesses an entity graph within the database(s) 122. Examples of functions and services supported by the social network system 130 include the identification of other users of the client application 104 with which a particular user has relationships or is "following", and also the identification of other entities and interests of a particular user. The social network system 130 may access location information associated with each of the user's friends or other social network connections to determine where they live or are currently located geographically. In addition, the social network system 130 may maintain a location profile for each of the user's friends indicating the geographical location where the user's friends live.

The third-party resources system 132 may communicate third-party resources 110 to the client devices 102 from third-party systems 108. In this way, the third-party resources system 132 may control the flow of third-party resources 110 to the client devices 102 from the third-party systems 108. In various examples, the third-party resources system 132 may also monitor the usage of the third-party resources 110 within the client application 104. For example, the third-party resources system 132 may determine a number of times that one or more third-party resources 110 are launched within the client application 104. In addition, the third-party resources system 132 may determine a frequency of use for one or more third-party resources 110, In various examples, the third-party resources system 132 may obtain data from the client devices 102 indicating usage of third-party resources 110 by users of the client application 104. In one or more examples, the third-party resources system 132 may request data related to usage of the third-party resources 110 from the client devices 102. In one or more additional examples, the client devices 102 may send the data related to the usage of the third-party resources 110 to the server system 112 at least one of periodically or when a change in the usage of the third-party resources 110 is detected.

The third-party resources system 132 may store data indicating usage of the third-party resources 110 in conjunction with accounts of users of the client application 104 that are using the third-party resources 110. For example, the database(s) 122 may store user profile data 134 related to accounts of users of the client application 104. The user profile data 134 may include personal information of users of the client application 104, one or more identifiers of users of the client application 104 (e.g., user name, avatar(s), etc.), login information of users of the client application 104, authentication information of users of the client application 104, location information of users of the client application 104, contact information of additional users of the client application 104, or one or more combinations thereof. The user profile data 134 may also indicate content generated using the client application 104 with respect to users of the client application 104. The content may include at least one of message content, video content, text content, image content, or audio content. Additionally, the user profile data 134 may indicate augmented reality content items that are related to users of the client application 104.

The user profile data 134 may also include usage data 136 that indicates the usage of features of the client application 104. In various examples, the usage data 136 may indicate a viewing history with respect to content that is accessible via the client application 104. For example, the usage data 136 may indicate viewing information with respect to at least one of message content, video content, or image content that is accessible via the client application 104, In one or more examples, the usage data 136 may indicate characteristics of users of the client application 104 that access content items via the client application 104. The usage data 136 may also indicate characteristics of creators of the content viewed by users of the client application 104. In one or more additional examples, the usage data 136 may indicate usage of one or more augmented reality content items of the client application 104. Further, the usage data 136 may indicate usage of third-party resources 110 within the client application 104.

The user profile data 134 may also include third-party resources information 138. The third-party resources information 138 may indicate third-party resources 110 that users of the client application 104 have associated with their respective accounts with the client application 104. In one or more examples, third-party resources 110 may be associated with accounts of users of the client application 104 in response to user input obtained via the client application 104 indicating that third-party resources 110 have been selected by users and added to respective collections of third-party resources 110 for individual users of the client application 110. Additionally, third-party resources 110 may be associated with accounts of users of the client application 104 in response to the users of the client application 104 launching or accessing the third-party resources 110.

The third-party resources information 138 may also indicate recommendations for third-party resources 110 for users of the client application 104. For example, the third-party resources system 132 may analyze characteristics of users of the client application 104 to determine users of the client application 104 having user profiles that have at least a threshold amount of similarity. To illustrate the third-party resources system 132 may analyze characteristics of users of the client application 104, personal information of users of the client application 104 (e.g., age, profession, education level, etc.), location information of users of the client application 104, content viewing history of users of the client application 104, history of usage of third-party resources 110, or one or more combinations thereof, to determine a measure of similarity between profiles of users of the client application 104. The third-party resources system 132 may identify third-party resources 110 accessed by a first user of the client application 104 and determine recommendations for a second user of the client application 104 that has a user profile with at least a threshold amount of similarity with respect to the user profile of the first user. In one or more illustrative examples, the third-party resources system 132 may determine that a user profile of a first user of the client application 104 has at least a threshold amount of similarity with a user profile of a second user of the client application 104. In these scenarios, the third-party resources system 132 may also determine that a third-party resource associated with an account of the first user of the client application 104 is absent from an account of the second user of the client application 104. The third-party resources system 132 may proceed to determine that the third-party resource 110 is a recommendation for the second user of the client application 104.

In one or more additional examples, the third-party resources system 132 may determine at least a portion of a layout for user interface elements that correspond to third-party resources 110. In various examples, the third-party resources system 132 may provide information to the client application 104 that the client application 104 may use to determine an arrangement of user interface elements within a user interface of the client application 104, where the user interface elements correspond to individual third-party resources 110 that are accessible by users of the client application 104. For example, the third-party resources system 132 may send information to the client device 104 indicating third-party resources 110 that are associated with an account of a user of the client application 104 and a frequency of use of the third-party resources 110. The client application 104 may use the information received from the third-party resources system 132 to determine that user interface elements corresponding to at least a portion of the third-party resources 110 are to be displayed in the user interface. Further, the client application 104 may determine an order in which to display the user interface elements based on the frequency of use of the third-party resources 110 that correspond to the respective user interface elements. In one or more illustrative examples, third-party resources 110 having a relatively higher frequency of use by the user of the client application 104 may appear in the user interface before other third-party resources 110 having a relatively lower frequency of use by the user of the client application 104. The third-party resources system 132 may also send recommendations for third-party resources 110 to the client application 104 such that the client application 104 may cause user interface elements that correspond to the recommendations to be displayed in the user interface.

The third-party resources system 132 may also directly send a layout of user interface elements corresponding to third-party resources 110 to the client application 104. The client application 104 may then cause the layout of user interface elements to be displayed in a user interface. In one or more implementations, the layout determined by the third-party resources system 132 may be determined based on the same or similar information as that provided by the third-party resources system 132 to the client application 104 in implementations where the client application 104 determines the layout of the user interface elements corresponding to the third-party resources 110. For example, at least one of frequency of use of third-party resources 110 or recency of use of third-party resources 110 by a user of the client application 104 may be used by the third-party resources system 132 to determine a layout of user interface elements that corresponds to third-party resources 110. In various examples, the third-party resources system 132 may send information to the client application 104 indicating a layout of user interface elements that correspond to third-party resources 110 in response to data received from the client application 104 indicating that a user interface that includes the user interface elements is being accessed via the client application 104. In one or more additional examples, the third-party resources system 132 may send information to the client application 104 indicating a layout of user interface elements that correspond to third-party resources 110 periodically or in response to determining a change in the layout information.

Further, the third-party resources system 132 may modify third-party resources 110 received from the one or more third-party systems 108 before sending the third-party resources 110 to the client devices 102. To illustrate, the third-party resources system 132 may modify the third-party resources 110 received from the one or more third-party systems 108 based on user account information of a user requesting access to the third-party resources 110. In addition, the third-party resources system 132 may modify the third-party resources 110 received from the one or more third-party systems 108 by adding access information to the third-party resources 110. The access information may include at least one of application programming interface (API) information or uniform resource indicator (URI) information that the client application 104 may use to access data from at least one of the one or more third-party systems 108 or the server system 112 in conjunction with implementation of the third-party resources 110.

Figure 2:
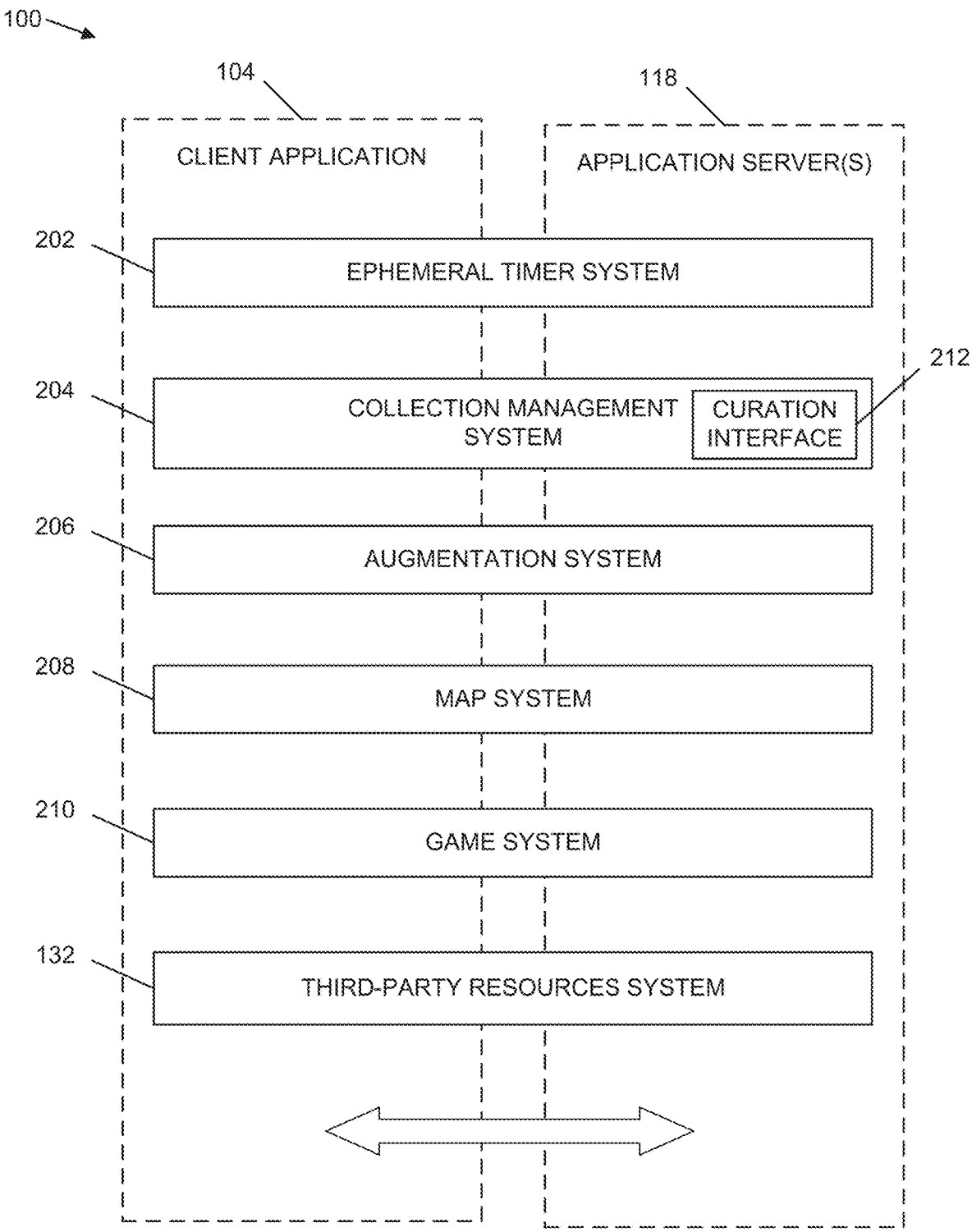
FIG. 2 is a diagrammatic representation of a system, in accordance with some examples, that may have both client-side and server-side functionality.

FIG. 2 is a block diagram illustrating further details regarding the server system 112, according to some examples. Specifically, the server system 112 is shown to comprise the client application 104 and the application servers 118. The server system 112 embodies a number of subsystems, which are supported on the client-side by the client application 104 and on the sever-side by the application servers 118. These subsystems include, for example, an ephemeral timer system 202, a collection management system 204, an augmentation system 206, a map system 208, a game system 210, and the third-party resources system 132.

The ephemeral timer system 202 is responsible for enforcing the temporary or time-limited access to content by the client application 104 and the messaging application system 126. The ephemeral timer system 202 incorporates a number of timers that, based on duration and display parameters associated with a message, or collection of messages (e.g., a story), selectively enable access (e.g., for presentation and display) to messages and associated content via the client application 104, Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story," Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with content produced via the client application 104, such as a message. For example, the augmentation system 206 provides functions related to the generation and publishing of media overlays for content processed by the server system 112. The augmentation system 206 operatively supplies a media overlay or augmentation (e.g., an image filter) to the client application 104 based on a geolocation of the client device 102. In another example, the augmentation system 206 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database(s) 122 and accessed through the database server(s) 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the client application 104. For example, the map system 208 enables the display of user icons or avatars (e.g., stored in profile data 308 of FIG. 3) on a map to indicate a current or past location of "friends" of a user, as well as media content (e.g., collections of messages including photographs and videos) generated by such friends, within the context of a map. For example, a message posted by a user to the server system 112 from a specific geographic location may be displayed within the context of a map at that particular location to "friends" of a specific user on a map interface of the client application 104. A user can furthermore share his or her location and status information (e.g., using an appropriate status avatar) with other users of the server system 112 via the client application 104, with this location and status information being similarly displayed within the context of a map interface of the client application 104 to selected users.

The game system 210 provides various gaming functions within the context of the client application 104. The client application 104 provides a game interface providing a list of available games that can be launched by a user within the context of the client application 104, and played with other users of the server system 112. The server system 112 further enables a particular user to invite other users to participate in the play of a specific game, by issuing invitations to such other users from the client application 104. The client application 104 also supports both the voice and text messaging (e.g., chats) within the context of gameplay, provides a leaderboard for the games, and also supports the provision of in-game rewards (e.g., coins and items).

The third-party resources system 132 may facilitate the communication between third-party systems and client devices with respect to third-party resources that are executed within the client application 104. The third-party resources system 132 may also determine recommendations for third-party resources for users of the client application 104. Additionally, the third-party resources system 132 may determine an arrangement of user interface elements that correspond to third-party resources within a user interface generated by the client application 104 that may be used to access the third-party resources. In one or more examples, the third-party resources system 132 may determine the arrangement based on usage data with respect to a number of third-party resources utilized by respective users of the client application 104.

Figure 3:
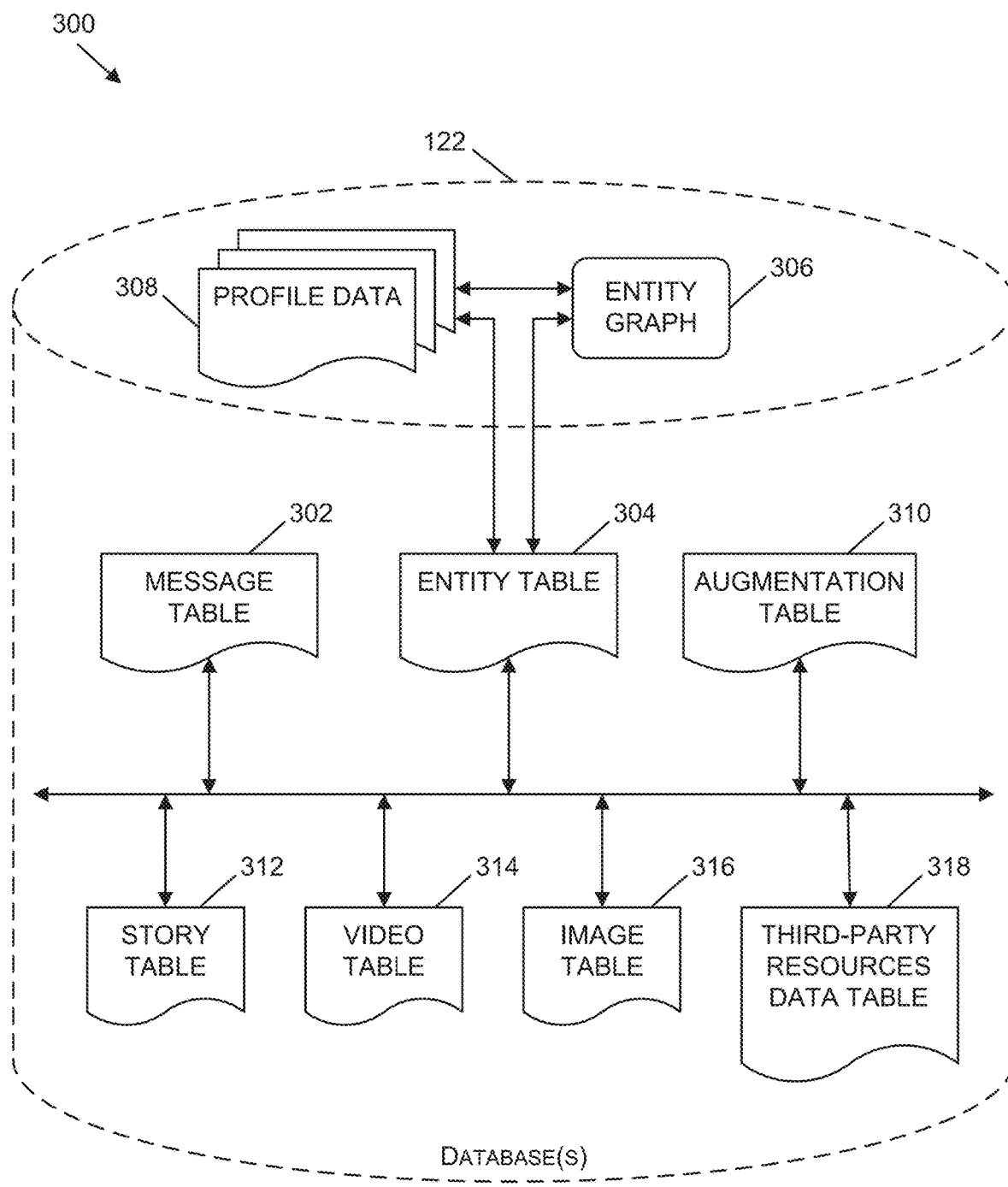
FIG. 3 is a schematic diagram illustrating data that may be stored in a database of a server system, according to one or more example implementations.

FIG. 3 is a schematic diagram illustrating data structures 300 which may be stored in the database(s) 122 of the server system 112, according to one or more example implementations. While the content of the database(s) 122 is shown to comprise a number of tables, it will be appreciated that the data could be stored in other types of data structures (e.g., as an object-oriented database).

The database 122 includes message data stored within a message table 302. This message data includes, for any particular one message, at least message sender data, message recipient (or receiver) data, and a payload.

An entity table 304 stores entity data, and is linked—referentially) to an entity graph 306 and profile data 308. Entities for which records are maintained within the entity table 304 may include individuals, corporate entities, organizations, objects, places, events, and so forth. Regardless of entity type, any entity regarding which the server system 112 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the architecture 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages or other data communicated via the architecture 100, and on map interfaces displayed by client application 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

In various examples, the profile data 308 may indicate third-party resources that are associated with accounts of individual users of the client application 104. The profile data. 308 may also indicate usage data of third-party resources by users of the client application 104.

The database 122 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. Some examples may involve generating a three-dimensional mesh model of the object or objects, and using transformations and animated textures of the model within the video to achieve the transformation, in other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm e.g., Viola-Jones). Then, an Active Shape Model (ASM) algorithm is applied to the face region of an image to detect facial feature reference points.

Other methods and algorithms suitable for face detection can be used. For example, in some implementations, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In various examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In one or more systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

A computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database(s) 122 may also store a third-party resources data table 318. The third-party resources data table 318 may store information indicating third-party resources that are available to users of the client application 104. The third-party resources data table 318 may also store information to access third-party resources. For example, for individual third-party resources, the third-party resources data table 318 may store information indicating a storage location related to the individual third-party resources, such as a uniform resource indicator. The individual third-party resources may be stored by third-party systems that at least one of create, provide, maintain, manage, or control the respective third-party resources. Additionally, the third-party resources data table 318 may indicate API information, such as one or more API calls, that may be used by the client application 104 to access third-party resources. In one or more examples, the third-party resources may include markup language documents that are implemented within the client application 104, In various examples, the third-party resources table 318 may store at least a portion of the markup language documents related to individual third-party resources.

Figure 4:
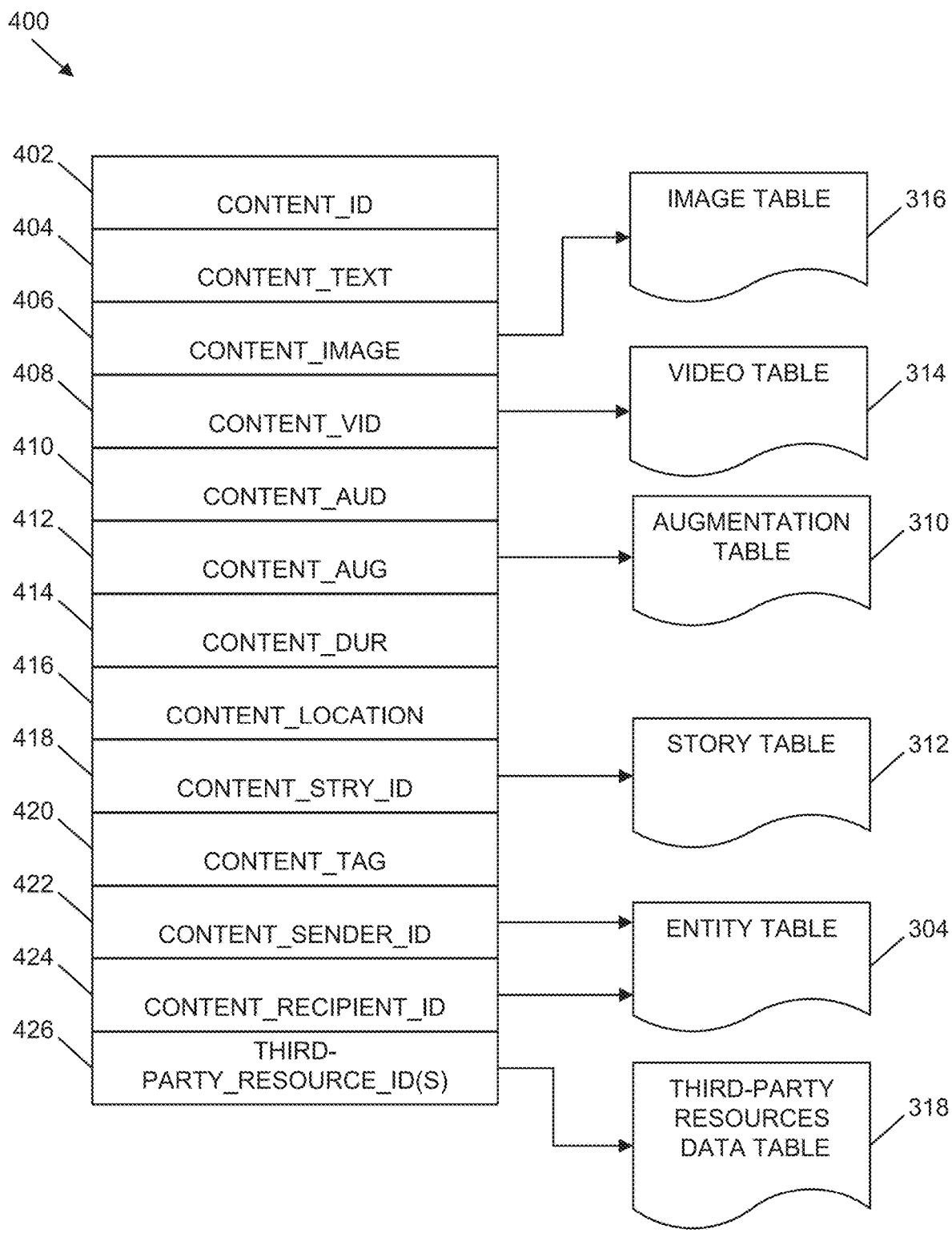
FIG. 4 is a schematic diagram illustrating an example framework for content that may be accessible via a client application, in accordance with one or more example implementations.

FIG. 4 is a schematic diagram illustrating an example framework for content 400, according to some implementations. The content 400 may be generated by the client application 104. In various examples, the content 400 may be generated by a first instance of the client application 104 and communicated to at least one of a second instance of the client application 104 or the server system 112. In situations where the content 400 includes a message, the content 400 may be used to populate the message table 302 stored within the database(s) 122 and accessible by the application server 114. In one or more implementations, the content 400 may be stored in memory as "in-transit" or "in-flight" data of at least one of client devices 102 or the application server 114. The content 400 is shown to include at least a portion of the following components:

content identifier 402: a unique identifier that identifies the content 400.

content text payload 404: text, to be generated by a user via a user interface of the client device 102, and that is included in the content 400.

content image payload 406: image data, captured by a camera component of a client device 102 or retrieved from a memory component of a client device 102, and that is included in the content 400. Image data for a sent or received content 400 may be stored in the image table 316.

content video payload 408: video data, captured by a camera component or retrieved from a memory component of the client device 102, and that is included in the content 400. Video data for a sent or received content 400 may be stored in the video table 314.

content audio payload 410: audio data, captured by a microphone or retrieved from a memory component of the client device 102, and that is included in the content 400.

content augmentation data 412: augmentation data (e.g., filters, stickers, or other annotations or enhancements) that represents augmentations to be applied to content image payload 406, content video payload 408, or content audio payload 410 of the content 400. Augmentation data for sent or received content 400 may be stored in the augmentation table 310.

content duration parameter 414: parameter value indicating, in seconds, the amount of time for which one or more portions of the content 400 (e.g., the content image payload 406, content video payload 408, content audio payload 410) are to be presented or made accessible to a user via the client application 104.

content geolocation parameter 416: geolocation data (e.g., latitudinal and longitudinal coordinates) associated with the content payload of the message. Multiple content geolocation parameter 416 values may be included in the payload, each of these parameter values being associated with respect to content items included in the content (e.g., a specific image into within the content image payload 406, or a specific video in the content video payload 408).

content story identifier 418: identifier values identifying one or more content collections (e.g., "stories" identified in the story table 312) with which a particular item in the content image payload 406 of the content 400 is associated. For example, multiple images within the content image payload 406 may each be associated with multiple content collections using identifier values.

content tag 420: each content 400 may be tagged with multiple tags, each of which is indicative of the subject matter of content included in the content payload. For example, where a particular image included in the content image payload 406 depicts an animal (e.g., a lion), a tag value may be included within the content tag 420 that is indicative of the relevant animal. Tag values may be generated manually, based on user input, or may be automatically generated using, for example, image recognition, content sender identifier 422: an identifier (e.g., a messaging system identifier, email address, or device identifier) indicative of a user of the client device 102 on which the content 400 was generated and from which the content 400 was sent.

content receiver identifier 424: an identifier (e.g., a messaging system identifier, email address, or device identifier) indicative of a user of the client device 102 to which the content 400 is addressed.

third-party application resource identifier(s) 426: one or more identifiers of third-party application resources that may be executed with respect to the content. In one or more examples, the content 400 may include one or more messages exchanged in relation to a third-party resource that corresponds to the third-party application resource identifier 426. As a result, communications exchanged in relation to third-party application resources executed within an instance of the client application 104 may be tracked and routed to intended recipients that are also executing the third-party application resource within an instance of the client application 104.

The data (e.g., values) of the various components of content 400 may correspond to pointers to locations in tables within which the data is stored. For example, an image value in the content image payload 406 may be a pointer to (or address of) a location within an image table 316. Similarly, values within the content video payload 408 may point to data stored within a video table 314, values stored within the content augmentation data 412 may point to data stored in an augmentation table 310, values stored within the content story identifier 418 may point to data stored in a story table 312, and values stored within the content sender identifier 422 and the content receiver identifier 424 may point to user records stored within an entity table 304. The third-party resource identifier(s) 426 may point to information in the third-party resources data table 318 related to accessing third-party resources that are related to the content. In one or more illustrative examples, in the context of a messaging conversation, the third-party application resources identifier 426 may indicate a third-party application resource that is being executed by one or more participants in the conversation and the third-party application resource identifier 426 may be used by client devices of additional participants in the messaging conversation to join a session of the third-party resources using information included in the third-party application resources data table 318.

Figure 5:
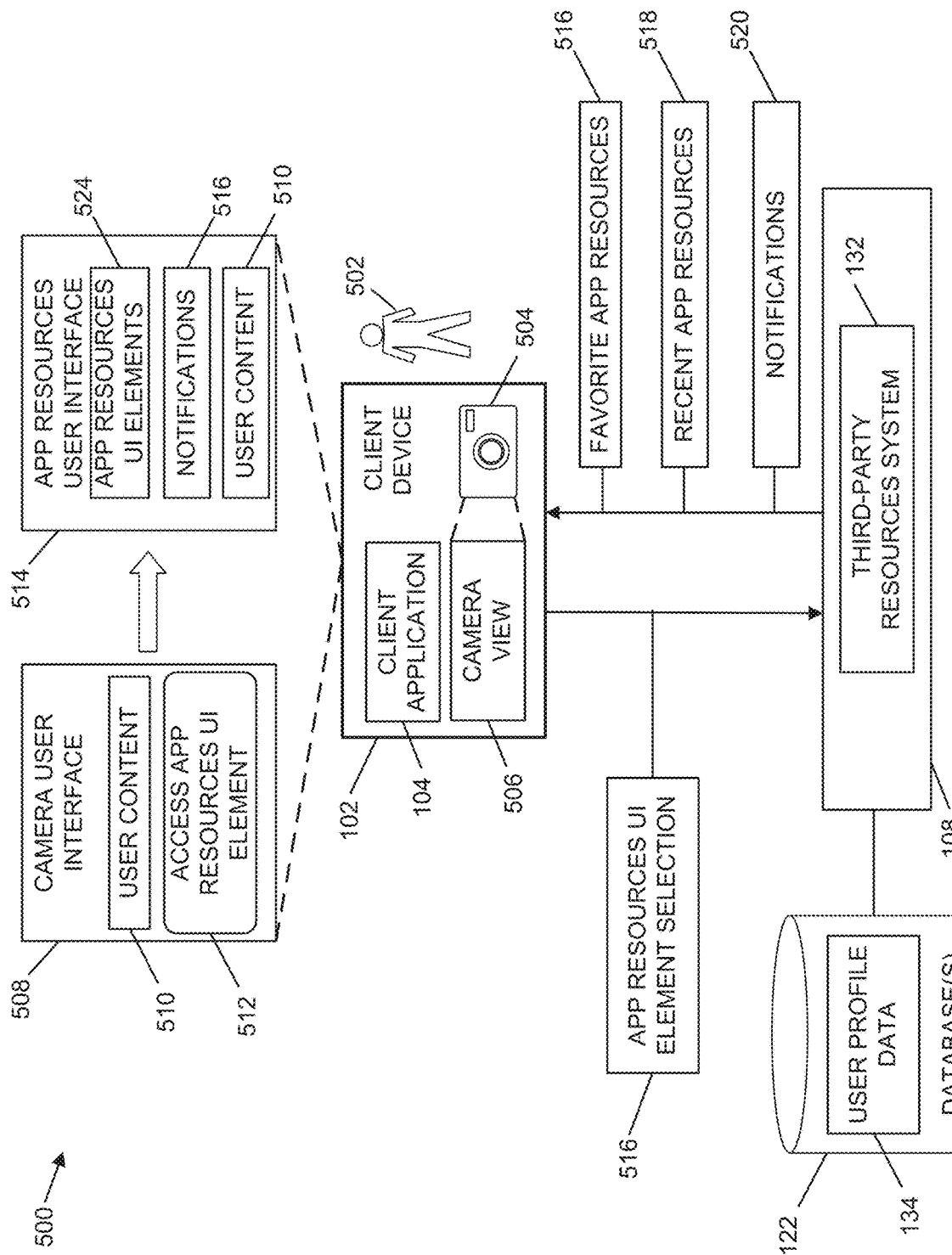
FIG. 5 is a diagrammatic representation illustrating an architecture to access third-party resources within a client application via a camera user interface, in accordance with one or more example implementations.

FIG. 5 is a diagrammatic representation illustrating an architecture 500 to access third-party resources within a client application via a camera user interface, in accordance with one or more example implementations. The architecture 500 may include a client device 102 that is operated by a user 502. The client device 102 may store and execute an instance of the client application 104. The client device 102 may also include one or more cameras, such as the camera 504. The camera 504 may capture at least one of image content or video content. The client device 102 may also include one or more input devices that capture audio content that may correspond to video content captured by the camera 504. The camera 504 may capture a camera view 506 that may include a live view of content being captured by the camera 504.

The client application 104 may cause a number of user interfaces to be displayed via one or more display devices of the client device 102. For example, the client application 104 may cause a camera user interface 508 to be displayed. The camera user interface 508 may include user content 510. The user content 510 may include at least one of image content or video content captured via the camera 504. In one or more examples, the user content 510 may include the camera view 506, In one or more additional examples, the user content 510 may include content previously captured by the camera 504. In various examples, at least a portion of the user content 510 may be stored by memory of the client device 102. In one or more further examples, at least a portion of the user content 510 may be stored in one or more data storage devices that are located remotely with respect to the client device 102 and accessible to the client device 102.

The camera user interface 508 may also include an access application resources user interface element 512. The access application resources user interface element 512 may be selectable to launch an application resources user interface 514 that includes user interface elements that are selectable to launch instances of resources within the client application 104. In various examples, the resources may include third-party application resources that are at least one of created or maintained by a service provider different from the service provider that created and maintains the client application 104. In one or more examples, the application resources may operate within an instance of the client application 104. Additionally, the application resources may include fewer components, use fewer processing resources, and use fewer memory resources than client applications.

In response to input from the user 502 to select the access application resources user interface element 512, an application resources user interface element selection 516 may be generated and sent to the server system 108. The third-part resources system 132 may then determine at least a portion of the content displayed in the application resources user interface 514. For example, the third-party resources system 132 may determine resources that are accessible from the application resources user interface 514. In various examples, the third-party resources system 132 may analyze a portion of the user profile data 134 that corresponds to the user 502 to determine application resources to be accessible from the application resources user interface 514. In one or more examples, the third-party resource system 132 may analyze the user profile data 134 for the user 502 to determine favorite application resources 516. In various examples, the third-party resources system 132 may determine a frequency of access of application resources by the user 502. The third-party resources system 132 may then rank the resources based on the respective frequency of use. The favorite application resources 516 can include a number of the ranked application resources, such as the five highest ranked application resources, the ten highest ranked application resources, the fifteen highest ranked application resources, or the twenty highest ranked application resources.

The third-party resources system 132 may also analyze the user profile data 134 of the user 502 to determine recent application resources 518. To illustrate, the third-party resources system 132 may analyze the user profile data 134 of the user 502 to determine application resources accessed by the user 502 via the client application 104 within a period of time, such as at least 30 minutes from the time of the application resources user interface selection 516, at least 60 minutes from the time of the application resources user interface selection 516, at least 2 hours from the time of the application resources user interface selection 516, at least 6 hours from the time of the application resources user interface selection 516, or at least 12 hours from the time of the application resources user interface selection 516.

Additionally, the third-party resources system 132 may analyze the user profile data 134 of the user 502 to determine notifications 520. The notifications 520 may correspond to content that is accessible via the client application 104 that may be of interest to the user 502. In one or more examples, the notifications 520 may be related to current events, media content, message content, calendar events, content of other users of the client application 104, advertisements, augmented reality content, one or more combinations thereof, and the like. In various examples, the third-party resources system 132 may analyze features of content accessed by the user 502 via the client application 104 to determine one or more notifications 520. In one or more illustrative examples, the third-party resources system 132 may implement one or more machine learning algorithms to determine content that may be of interest to the user and generate notifications 520 based on the content. The one or more machine learning algorithms may include one or more convolutional neural networks, one or more generative adversarial networks, one or more support vector machines, one or more random forests, one or more Bayesian networks, one or more feed forward neural networks, or one or more combinations thereof. The third-party resources system 132 may determine a measure of similarity between features of content accessed by the user 502 via the client application 104 and additional content accessible via the client application 104. The third-party resources system 132 may include the additional content having at least a threshold measure of similarity in the notifications 520.

In response to the application resources user interface element selection 516, the server system 108 may send at least one of the favorite application resources 516, the recent application resources 518, or the notifications 520 to the client device 102. The application resources user interface 514 may include a first section that includes application resources user interface elements 524, The application resources user interface elements 524 may be selectable to launch an application resource. In one or more examples, the application resources user interface elements 524 may correspond to at least a portion of the favorite application resources 516. The application resources user interface elements 524 may also correspond to at least a portion of the recent application resources 518. Additionally, the application resources user interface 514 may include a second section that includes at least a portion of the notifications 520. Further, the application resources user interface 514 may include a third section that includes a portion of the user content 510 displayed by the camera user interface 508. In one or more illustrative examples, the application resources user interface 514 may include a user interface element that is selectable to return to the camera user interface 508 from the application resources user interface 514.

Although in the illustrative example of FIG. 5, the third-party resources system 132 is shown as being implemented in the server system 108, in one or more additional examples, at least a portion of the operations described in relation to the third-party resources system 132 may be performed by the client device 102. Additionally, although operations of the architecture 500 are described in relation to third-party resources, at least a portion of the operations performed by the architecture 500 may be performed in relation to resources at least one of created or maintained by a service provider that created and maintains the client application 104.

Figure 6:
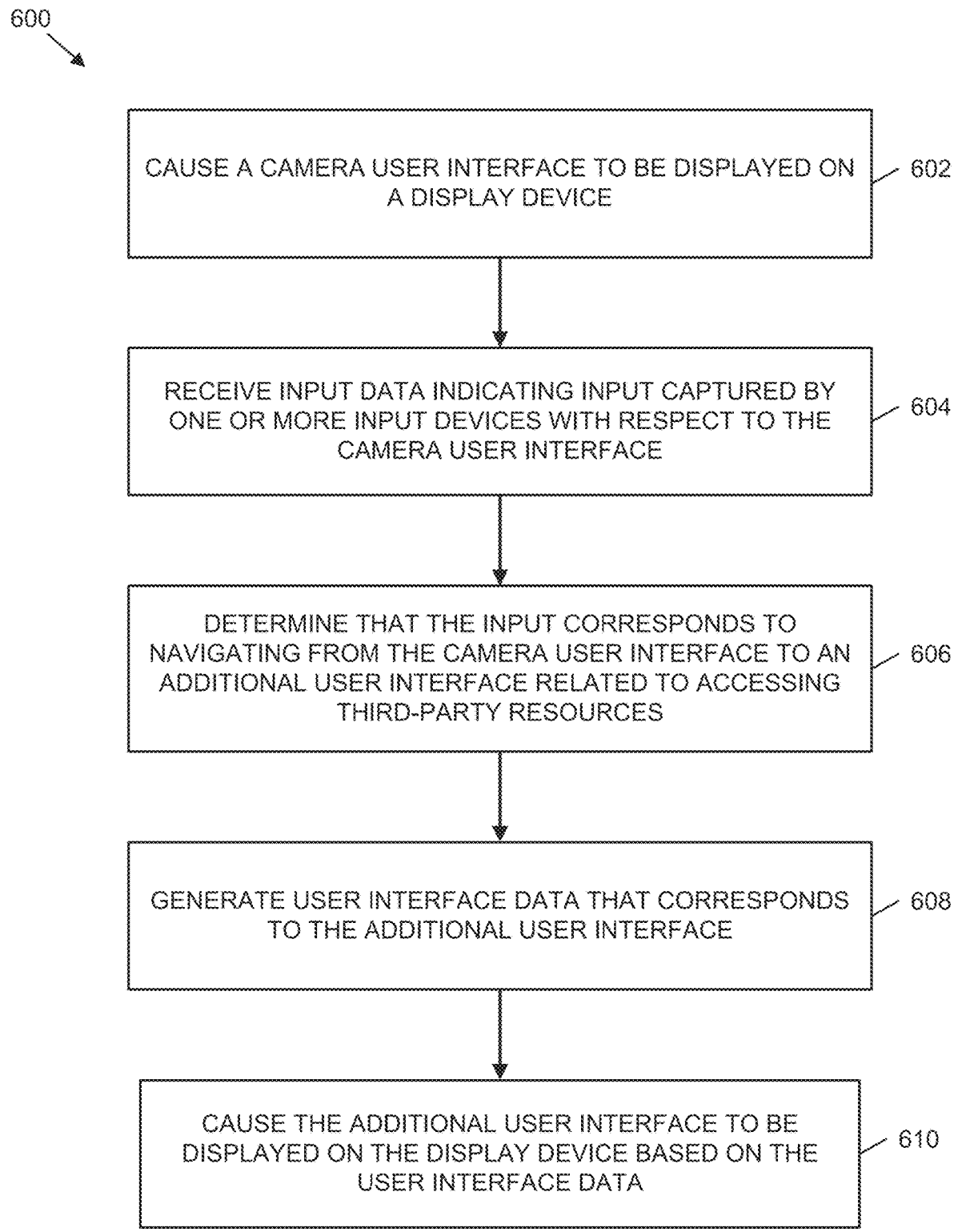
FIG. 6 is a flowchart illustrating example operations of a process to provide information to client devices in relation to accessing third-party resources via a client application with messaging capability, in accordance with one or more example implementations.
Figure 7:
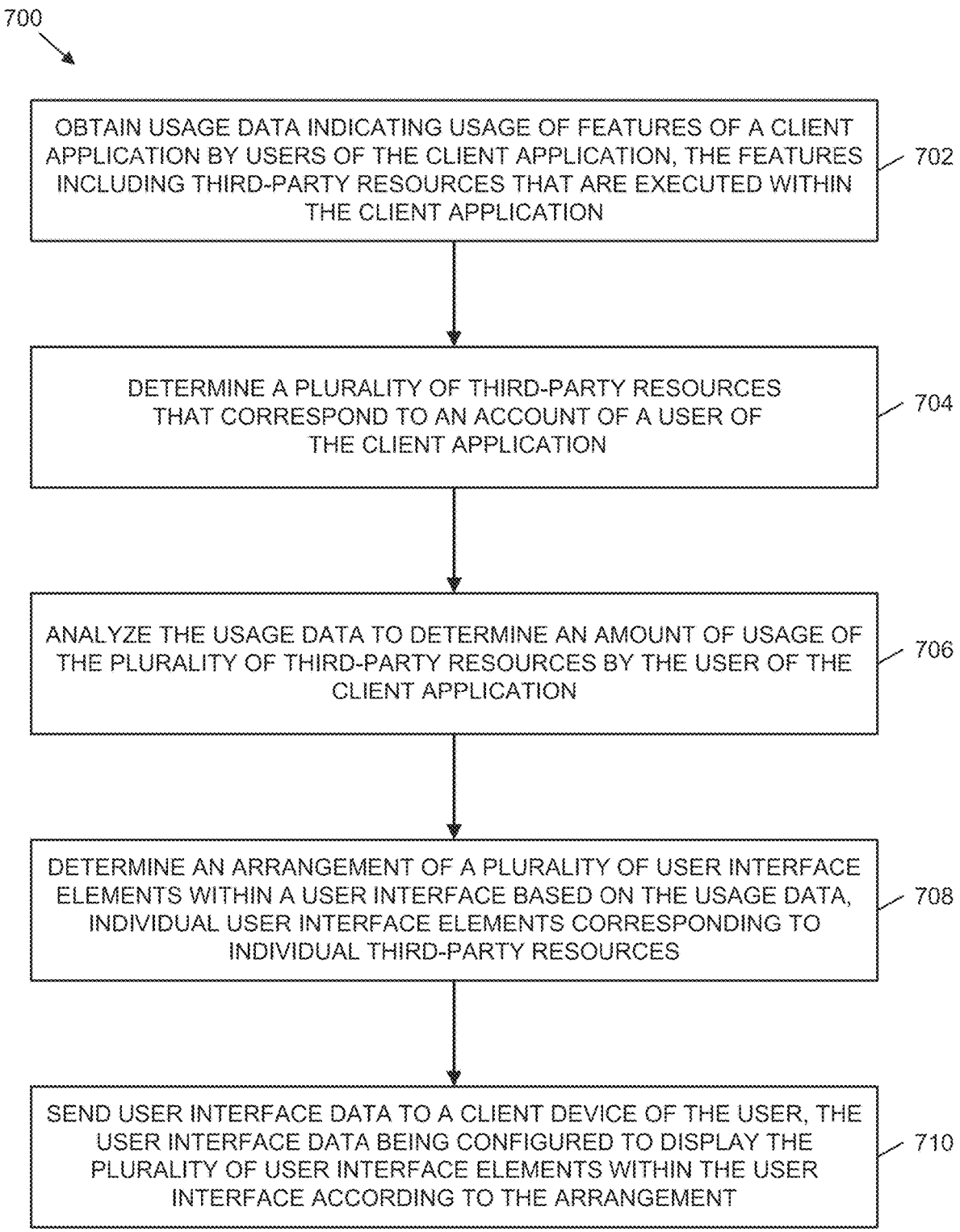
FIG. 7 is a flowchart illustrating example operations of a process to access third-party resources via a client application with messaging capability, in accordance with one or more example implementations.

FIGS. 6 and 7 illustrate flowcharts of one or more implementations of processes to access third-party resources that are executable within an instance of a client application 104. The processes may be embodied in computer-readable instructions for execution by one or more processors such that the operations of the processes may be performed in part or in whole by the functional components of at least one of the client application 104 or the server system 112. Accordingly, the processes described below are by way of example with reference thereto, in some situations. However, in other implementations, at least some of the operations of the processes described with respect to FIG. 6 and FIG. 7 may be deployed on various other hardware configurations. The processes described with respect to FIG. 6 and FIG. 7 are therefore not intended to be limited to the server system 112 or client device 102 and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flowchart, illustrating example operations of a process 600 to provide information to client devices in relation to accessing third-party resources via a client application with messaging capability, in accordance with one or more example implementations. The process 600 may include, at operation 602, causing a camera user interface to be displayed on a display device. The camera user interface may include a view of at least one camera of a client device. The view may include a real-time or near real-time view of the at least one camera. At operation 604, the process 600 may include receiving input data indicating input captured by one or more input devices with respect to the camera user interface. In one or more examples, the input may correspond to a downward swiping motion with respect to the camera user interface.

The process 600 may include, at operation 606, determining that the input corresponds to navigating away from the camera user interface to an additional user interface related to accessing third-party resources. In one or more examples, the downward swiping motion may correspond to at least one of a threshold duration or a threshold distance before being identified as an input that corresponds to navigating away from the camera user interface. At operation 608, the process 600 may include generating user interface data that corresponds to the additional user interface. In one or more examples, the user interface data may indicate an arrangement of user interface elements that each correspond to a respective third-party application resource. The user interface data may also indicate additional content to display in an application resources user interface, such as one or more notifications that correspond to a user of the client application. Additionally, at operation 610, the process 600 may include causing the additional user interface to be displayed on the display device based on the user interface data.

FIG. 7 is a flowchart illustrating example operations of a process 700 to access third-party resources via a client application with messaging capability, in accordance with one or more example implementations. At 702, the process 700 may include obtaining usage data indicating usage of features of a client application by users of the client application. The features may include third-party application resources that are executed within the client application. The process 700 may also include, at operation 704, determining a plurality of third-party application resources that correspond to an account of a user of the client application.

At operation 706, the process 700 may include analyzing the usage data to determine an amount of usage of the plurality of third-party application resources by the user of the client application. Additionally, at operation 708, the process 700 may include determining an arrangement of a plurality of user interface elements within a user interface based on the usage data. Individual user interface elements may correspond to individual third-party application resources. In one or more examples, the arrangement may indicate an order in which to display the plurality of user interface elements that is based on the usage data. For example, user interface elements that correspond to third-party application resources having a greater amount of usage may be displayed at least one of in descending order or more prominently than third-party application resources having a lesser amount of usage. Further, the process 700 may include, at operation 710, sending user interface data to a client device of the user. The user interface data may be configured to display the plurality of user interface elements within the user interface according to the arrangement.

Figure 8:
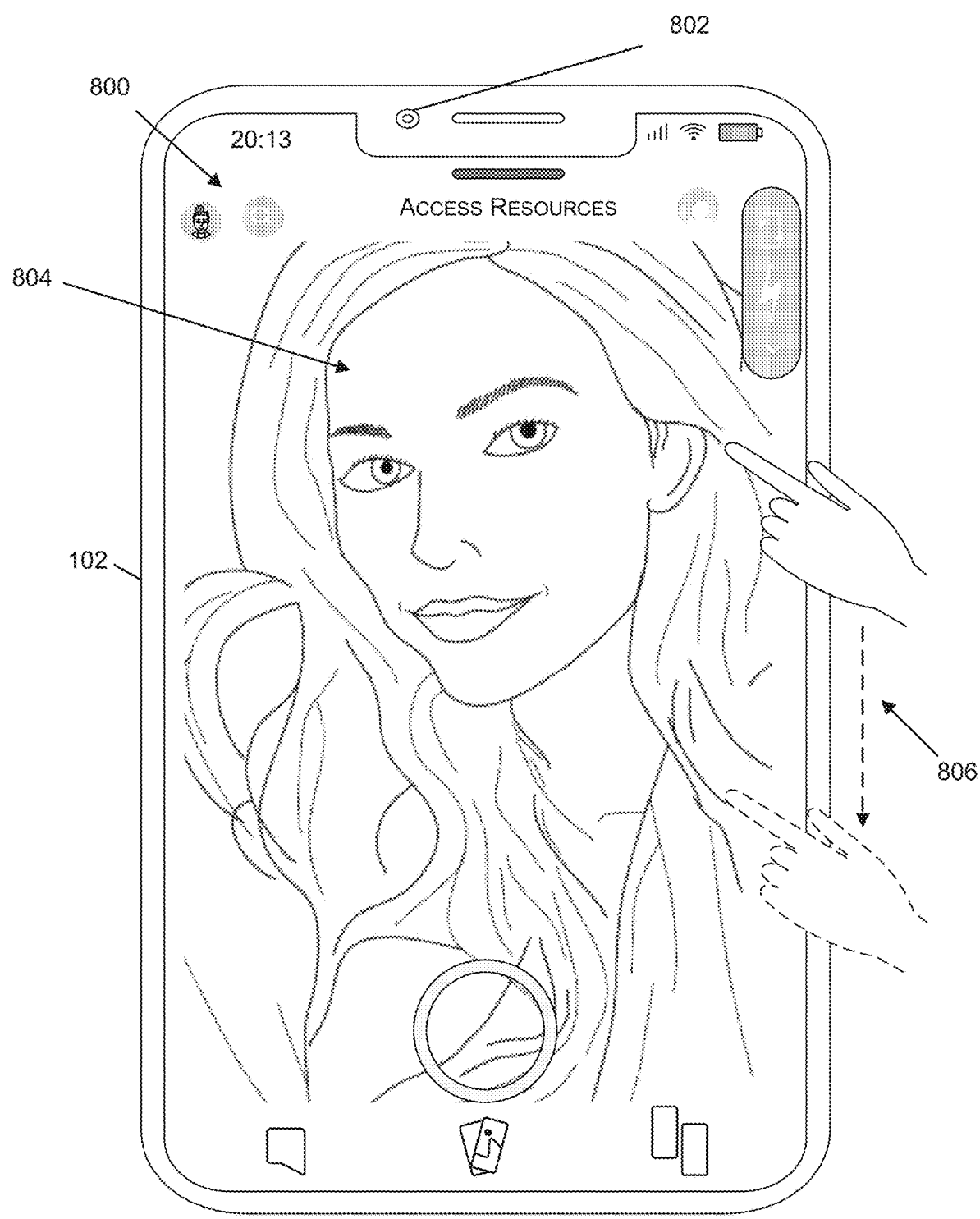
FIG. 8 is an illustration of a user interface showing a view of a camera of a client device and that may obtain input to generate an additional user interface that enables access to third-party resources, according to one or more example implementations.

FIG. 8 is an illustration of a user interface 800 showing a view of a camera 802 of a client device 102 and that may obtain input to generate an additional user interface that enables access to third-party resources, according to one or more example implementations. The user interface 800 may be displayed via a display device of the client device 102 and produced by a client application executed by the client device 102, such as the client application 104. The user interface 800 may include user content 804 that is captured by the camera 802. In the illustrative example of FIG. 8, a user may navigate away from the user interface 800 by providing user input illustrated at 806 that corresponds to a swiping down motion.

Figure 9:
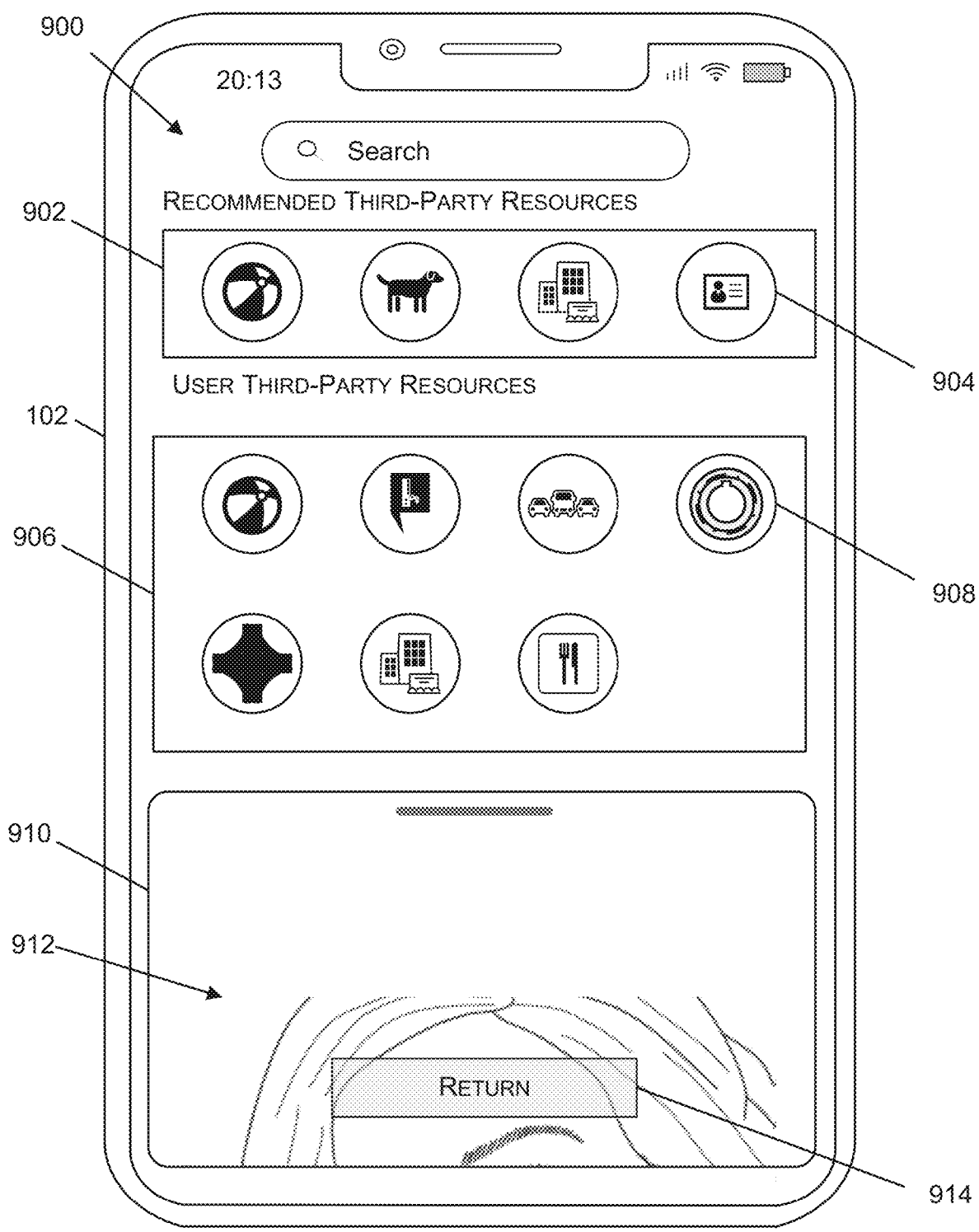
FIG. 9 is an illustration of a user interface that includes user interface elements that are selectable to launch one or more third-party resources and that includes a region showing a portion of a camera view, according to one or more example implementations.

FIG. 9 is an illustration of a user interface 900 that includes user interface elements that are accessible launch one or more third-party application resources and that includes a region showing a portion of a camera view, according to one or more example implementations. The user interface 900 may be displayed in response to the user input 806 shown in FIG. 8, The user interface 900 may be displayed via a display device of the client device 102 and produced by a client application executed by the client device 102, such as the client application 104.

The user interface includes a first region 902 that includes a first number of user interface elements 904. The user interface elements 904 may correspond to third-party application resources that are recommended to a user of the client device 102. Additionally, the user interface 900 may include a second region 906 that includes a second number of user interface elements 908. The second number of user interface elements 908 may correspond to third-party application resources associated with an account of the user of the client device 102. In various examples, the arrangement of the user interface elements 904 included in the first region 902 and the arrangement of the user interface elements 908 included in the second region 906 may be determined based on an analysis of one or more criteria. To illustrate, third-party application resource usage data, content access data, user demographics, user location, one or more combinations thereof, and so forth may be analyzed to determine the arrangement of the user interface elements 904 in the first region 902 and the arrangement of the user interface elements 908 included in the second region 906. In one or more illustrative examples, a first number of criteria may be analyzed to determine an arrangement of the user interface elements 904 included in the first region 902 and a second number of criteria, different from the first number of criteria may be analyzed to determine the arrangement of the user interface elements 908 of the second region 906. Further, the user interface 900 may include a third region 910. The third region 910 may include a partial view 912 of the camera interface displayed with respect to the interface 800 of FIG. 8. The user interface 900 may also include a user interface element 914 that is selectable to return to the user interface 800 of FIG. 8.

Figure 10:
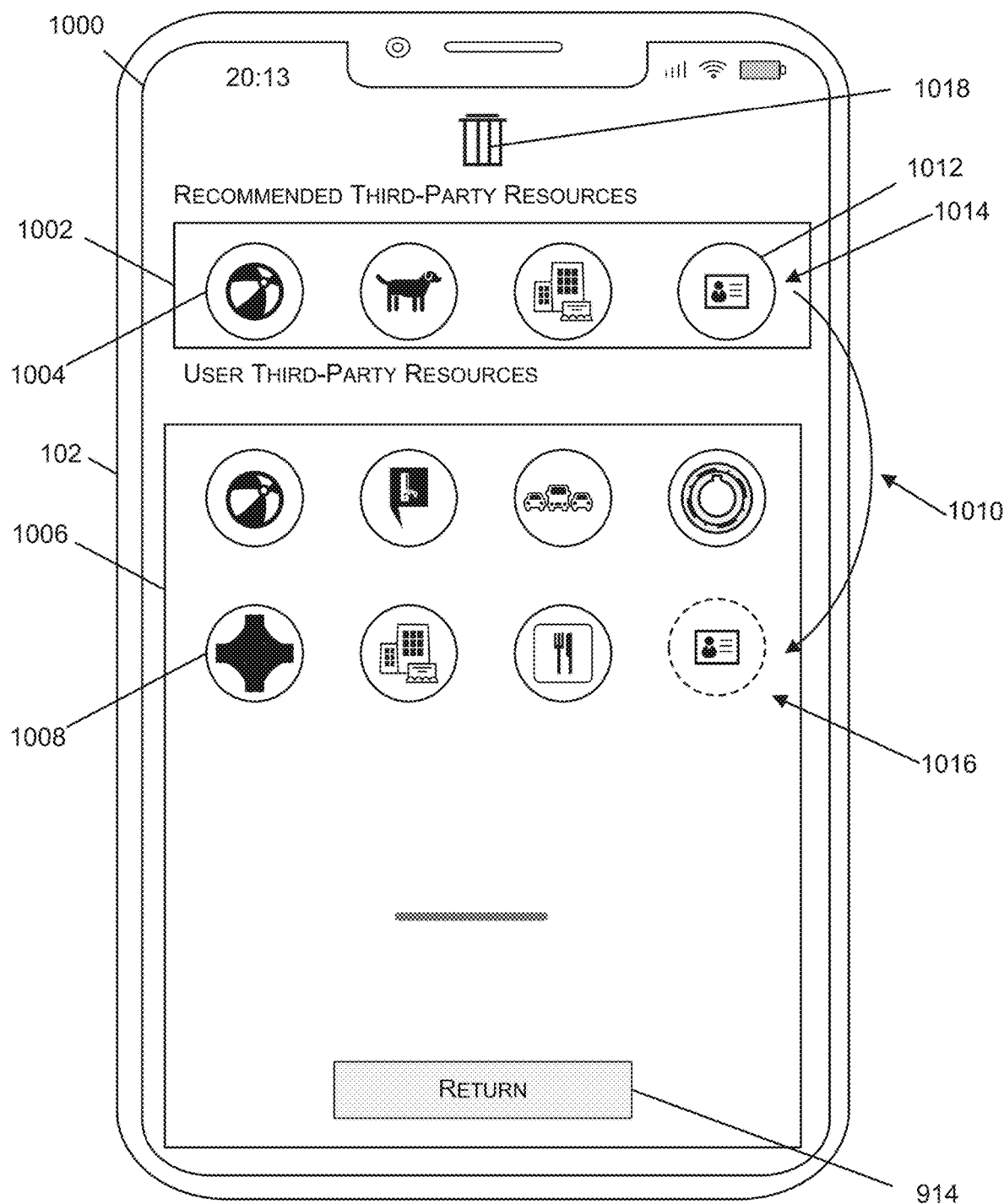
FIG. 10 is an illustration of a user interface that shows modifications to the user interface of FIG. 8 in response to input to modify the third-party resources accessible via the client application, according to one or more example implementations.

FIG. 10 is an illustration of a user interface 1000 that shows modifications to the user interface 900 of FIG. 9 in response to input to modify the third-party application resources accessible via the client application, according to one or more example implementations. The user interface 1000 may be displayed via a display device of the client device 102 and produced by a client application executed by the client device 102, such as the client application 104.

The user interface includes a first region 1002 that includes a first number of user interface elements 1004. The user interface elements 1004 may correspond to third-party application resources that are recommended to a user of the client device 102. Additionally, the user interface 1000 may include a second region 1006 that includes a second number of user interface elements 1008. The second number of user interface elements 1008 may correspond to third-party application resources associated with an account of the user of the client device 102.

The user interface 1000 may be displayed in response to a user input that is directed to modifying the user interface elements 1004 included in the first region 1002 or the user interface elements 1008 included in the second region 1006, such as adding or removing third-party application resources from an account of a user of the client device 102. In the illustrative example of FIG. 10, user input 1010 may be received to add a third-party application resource corresponding to the user interface element 1012 to an account of the user of the client device 102. The third-party application resource may be added by moving the user interface element 1010 from a first position 1014 to a second position 1016. In various examples, during the selection and movement of the user interface element 1012 from the first position 1014 to the second position 1016, the region of the user interface 900 related to showing a partial view of the user content of camera user interface is removed. After the user input 1010 is completed, the region of the user interface 900 related to showing the partial view of the user content of the camera user interface is returned. The user interface 1000 may also include a user interface element 1018 that appears during the user input 1010 that may be used to remove a third-party application resource from the account of the user of the client device 102. Further, the user interface 1000 may include a user interface element 1020 that is selectable to return to the camera user interface 900 of FIG. 9.

Figure 11:
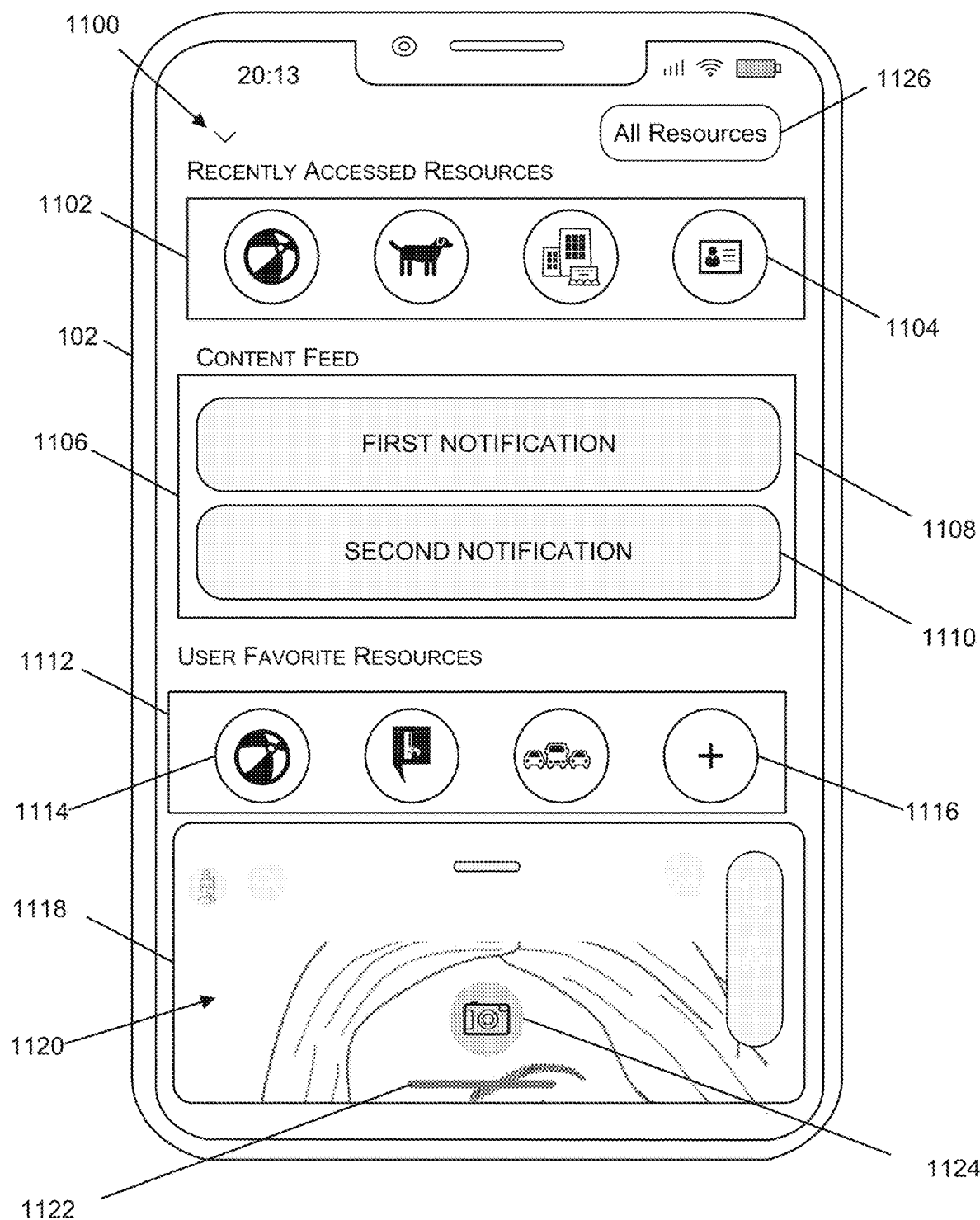
FIG. 11 is an illustration of a user interface 1100 that includes regions that display user interface elements that are selectable to access third-party application resources via a client application, a region that display notifications for a user of the client application, and a region that displays at least a portion of a camera user interface of the client application, according to one or more example implementations.

FIG. 11 is an illustration of a user interface 1100 that includes regions that display user interface elements that are selectable to access third-party application resources via a client application, a region that display notifications for a user of the client application, and a region that displays at least a portion of a camera user interface of the client application, according to one or more example implementations.

The user interface 1100 may include a first region 1102 that includes user interface elements 1104 that are selectable to access third-party application resources within a client application. In one or more examples, user input may be provided to access additional third-party application resource user interface elements. To illustrate, a swipe left input or a swipe right input may be provided to access additional third-party application resource user interface elements. In one or more illustrative examples, the third-party application resource user interface elements included in the first region 1102 may correspond to third-party application resources that have been recently accessed by a user of the client device 102.

The user interface 1100 may also include a second region 1106 that includes one or more notifications that are selectable to access additional content via the client application. In the illustrative example of FIG. 11, the second region 1106 may include a first notification 1108 that is selectable to access first content and a second notification 1110 that is selectable to access second content. In various examples, the notifications displayed in the second region 1106 may be customized or personalized for a user of the client device 102. In one or more examples, the notifications displayed in the second region 1106 can be determined based on interactions of the user of the client device 102 with the client application, such as the client application 104. To illustrate, the notifications included in the second region 1106 may be determined based on third-party application resources accessed by the user of the client device 102, content accessed by the user of the client device 102, content accessed by users of the client application having similar characteristics to the user of the client device 102, input from the user of the client device 102 indicating notification preferences, or one or more combinations thereof. In one or more additional examples, additional notifications may be viewed in the second region 1106 in response to user input detected with respect to the second region 1106. For example, a swipe left or swipe right input may be detected to remove a notification from the second region 1106 and where the notification removed from the second region 1106 may be replaced by an additional notification. Further, a swipe up or swipe down input may be detected to scroll through additional notifications displayed in the second region 1106.

Additionally, the user interface 1100 can include a third region 1112 that includes additional third-party application resource user interface elements, such at the third-party application resource user interface element 1114. The third-party application resource user interface element 1114 may be selectable to launch a third-party application resource that corresponds to the third-party application resource user interface element 1114. The third region 1112 may also include a user interface element 1116 that is selectable to add a third-party application resource user interface element to the third region 1112. In one or more illustrative examples, the third-party application resource user interface elements included in the third region 1112 may correspond to third-party application resources that have at least a threshold frequency of use by the user of the client device 102. In various examples, the third-party application resource user interface elements included in the third region 1112 may be labeled as favorite third-party application resources of the user of the client device 102. Additional user input may be provided to the third region 1112, such as swipe left, swipe right, or another scrolling input, to view additional third-party application resource user interface elements.

In one or more examples, selection of the user interface element 1104 or selection of the user interface element 1114 may cause a third-party application resource to launch within the client application. In these scenarios, at least a portion of the user interface 1100 may be replaced by one or more user interfaces of the third-party application resource. In various examples, functionality of the client application, such as at least one of messaging functionality, social networking functionality, camera functionality, or augmented reality functionality may be accessed via one or more user interfaces of the client application while one or more user interfaces of the third-party application resources are displayed.

Further, the user interface 1100 may include a fourth region 1118. The fourth region 1118 may display at least a portion of the user content 1120 that is included in a camera user interface of the client application. In one or more examples, the fourth region 1118 may display no greater than about 50% of the user content 1120, no greater than about 40% of the user content 1120, no greater than about 30% of the user content 1120, no greater than about 20% of the user content 1120, or no greater than about 10% of the user content 1120. In various examples, the fourth region 1118 may include a first user interface element 1122 and a second user interface element 1124 indicating that the camera user interface may be accessed directly via the user interface 1100. For example, at least one of the first user interface element 1122 or the second user interface element 1124 may be selectable to return to the camera user interface, such as the user interface 800 of FIG. 8, In addition, at least one of a scrolling input or a swipe up input may cause a return to the camera user interface from the user interface 1100.

The user interface 1100 may also include an additional user interface element 1126. The additional user interface element 1126 may be selectable to launch an additional user interface that displays indications of a number of third-party application resources that are accessible via the client application. In various examples, games may be included in the third-party application resources that are accessible via the client application. In one or more examples, the additional user interface accessible via the additional user interface element 1126 may include search functionality that enables the user of the client device 102 to search for third-party application resources. In one or more illustrative examples, the additional user interface may include a user interface element r search terms that correspond to third-party application resources.

Figure 12:
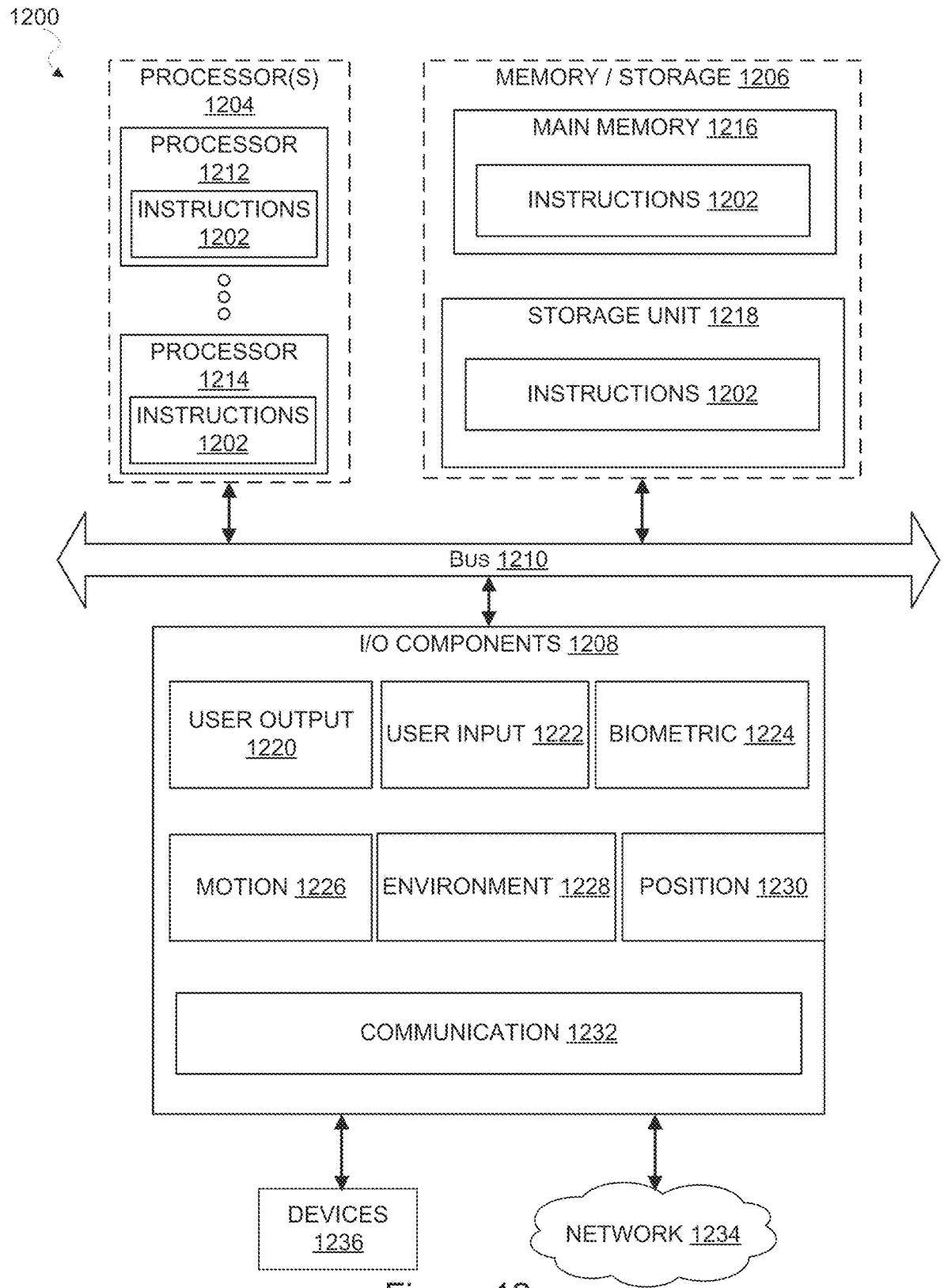
FIG. 12 is a block diagram illustrating components of a machine, in the form of a computer system, that may read and execute instructions from one or more machine-readable media to perform any one or more methodologies described herein, in accordance with one or more example implementations.

FIG. 12 is a block diagram illustrating components of a machine 1200, according to some example implementations, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1202 (e.g., software, a program, an application, an applet, an app, or other executable code) for causing the machine 1200 to perform any one or more of the methodologies discussed herein may be executed. As such, the instructions 1202 may be used to implement modules or components described herein. The instructions 1202 transform the general, non-programmed machine 1200 into a particular machine 1200 programmed to carry out the described and illustrated functions in the manner described. In alternative implementations, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1202, sequentially or otherwise, that specify actions to be taken by machine 1200. Further, while only a single machine 1200 is illustrated, the term "machine" shall also be taken to include a collection of machines that individually or jointly execute the instructions 1202 to perform any one or more of the methodologies discussed herein.

The machine 1200 may include processors 1204, memory/storage 1206, and 110 components 1208, which may be configured to communicate with each other such as via a bus 1210. In an example implementation, the processors 1204 (e.g., a central processing unit (CPU), a reduced instruction set computing (RISC) processor, a complex instruction set computing (CNC) processor, a graphics processing unit (GPU), a digital signal processor (DSP), an application-specific integrated circuit (ASIC), a radio-frequency integrated circuit (RTIC), another processor, or any suitable combination thereof) may include, for example, a processor 1212 and a processor 1214 that may execute the instructions 1202. The term "processor" is intended to include multi-core processors 1204 that may comprise two or more independent processors (sometimes referred to as "cores") that may execute instructions 1202 contemporaneously. Although FIG. 12 shows multiple processors 1204, the machine 1200 may include a single processor 1212 with a single core, a single processor 1212 with multiple cores (e.g., a multi-core processor), multiple processors 1212, 1214 with a single core, multiple processors 1212, 1214 with multiple cores, or any combination thereof.

The memory/storage 1206 may include memory, such as a main memory 1216, or other memory storage, and a storage unit 1218, both accessible to the processors 1204 such as via the bus 1210. The storage unit 1218 and main memory 1216 store the instructions 1202 embodying any one or more of the methodologies or functions described herein. The instructions 1202 may also reside, completely or partially, within the main memory 1216, within the storage unit 1218, within at least one of the processors 1204 (e.g., within the processor's cache memory), or any suitable combination thereof, during execution thereof by the machine 1200. Accordingly, the main memory 1216, the storage unit 1218, and the memory of processors 1204 are examples of machine-readable media.

The I/O components 1208 may include a wide variety of components to receive input, provide output, produce output, transmit information, exchange information, capture measurements, and so on. The specific I/O components 1208 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1208 may include many other components that are not shown in FIG. 10. The 110 components 1208 are grouped according to functionality merely for simplifying the following discussion and the grouping is in no way limiting. In various example implementations, the I/O components 1208 may include user output components 1220 and user input components 1222. The user output components 1220 may include visual components (e.g., a display such as a plasma display panel (PDP), a light emitting diode (LED) display, a liquid crystal display (LCD), a projector, or a cathode ray-tube (CRT)), acoustic components (e.g., speakers), haptic components (e.g., a vibratory motor, resistance mechanisms), other signal generators, and so forth. The user input components 1222 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 1208 may include biometric components 1224, motion components 1226, environmental components 1228, or position components 1230 among a wide array of other components. For example, the biometric components 1224 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1226 may include acceleration sensor components (e.g., accelerometer), gravitation sensor components, rotation sensor components (e.g., gyroscope), and so forth. The environmental components 1228 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors gas detection sensors to detection concentrations of hazardous gases for safety or to measure pollutants in the atmosphere), or other components that may provide indications, measurements, or signals corresponding to a surrounding physical environment. The position components 1230 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1208 may include communication components 1232 operable to couple the machine 1200 to a network 1234 or devices 1236. For example, the communication components 1232 may include a network interface component or other suitable device to interface with the network 1234. In further examples, communication components 1232 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1236 may be another machine 1200 or any of a wide variety of peripheral devices (e.g., a peripheral device coupled via a USB).

Moreover, the communication components 1232 may detect identifiers or include components operable to detect identifiers. For example, the communication components 1232 may include radio frequency identification (RIAD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1232, such as location via Internet Protocol (IP) geo-location, location via Wi-Fi® signal triangulation, location via detecting an NFC beacon signal that may indicate a particular location, and so forth.

Figure 13:
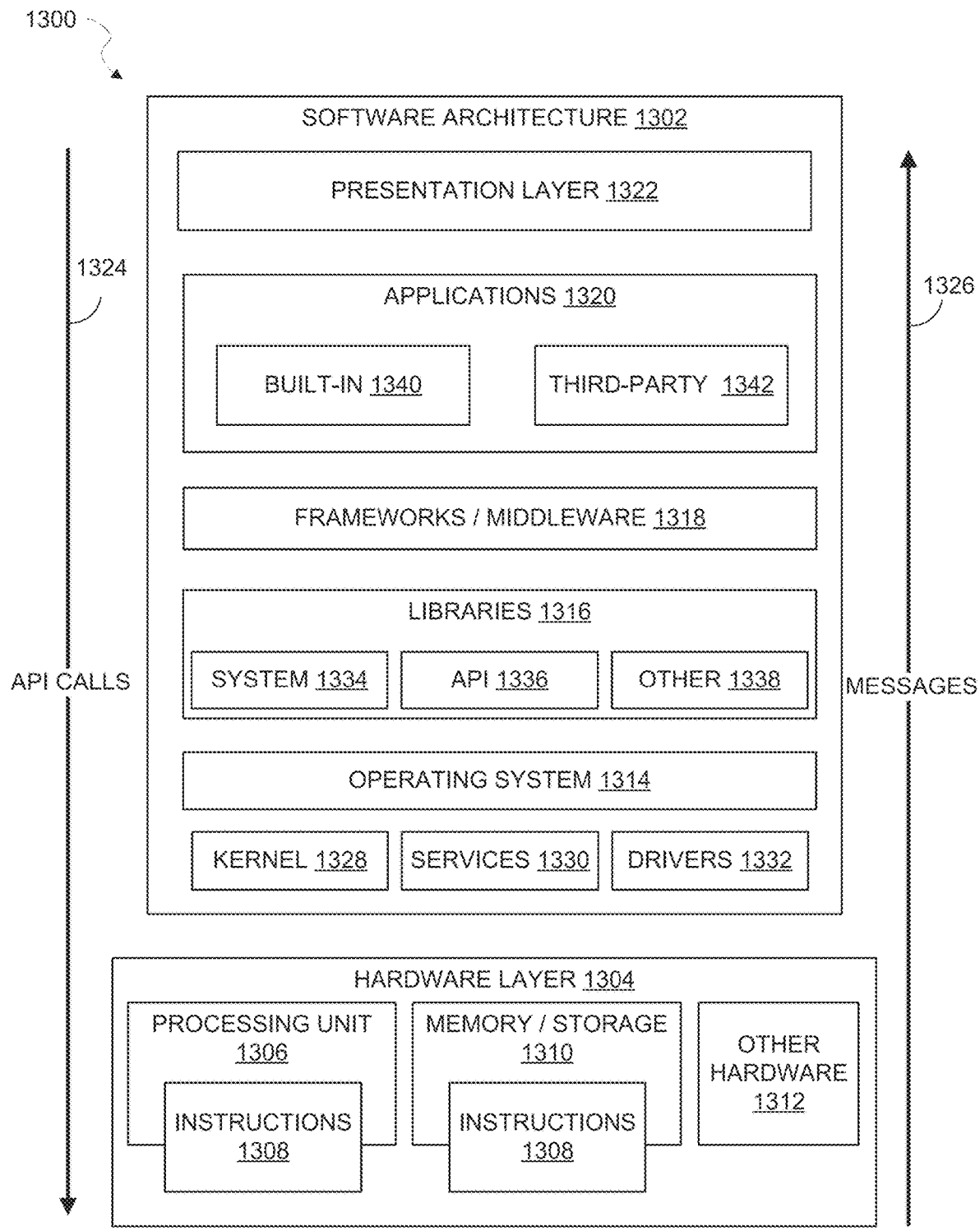
FIG. 13 is block diagram illustrating a representative software architecture that may be used in conjunction with one or more hardware architectures described herein, in accordance with one or more example implementations.

FIG. 13 is a block diagram illustrating system 1300 that includes an example software architecture 1302, which may be used in conjunction with various hardware architectures herein described. FIG. 13 is a non-limiting example of a software architecture and it will be appreciated that many other architectures may be implemented to facilitate the functionality described herein. The software architecture 1302 may execute on hardware such as machine 1200 of FIG. 12 that includes, among other things, processors 1204, memory/storage 1206, and input/output (I/O) components 1208. A representative hardware layer 1304 is illustrated and can represent, for example, the machine 1200 of FIG. 10. The representative hardware layer 1304 includes a processing unit 1306 having associated executable instructions 1308. Executable instructions 1308 represent the executable instructions of the software architecture 1302, including implementation of the methods, components, and so forth described herein. The hardware layer 1304 also includes at least one of memory or storage modules memory/storage 1310, which also have executable instructions 1308. The hardware layer 1304 may also comprise other hardware 1312.

In the example architecture of FIG. 12, the software architecture 1302 may be conceptualized as a stack of layers where each layer provides particular functionality. For example, the software architecture 1302 may include layers such as an operating system 1314, libraries 1316, frameworks/middleware 1318, applications 1320, and a presentation layer 1322. Operationally, the applications 1320 or other components within the layers may invoke API calls 1324 through the software stack and receive messages 1326 in response to the API calls 1324. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 are responsible for controlling or interfacing with the underlying hardware. For instance, the drivers 1332 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 provide a common infrastructure that is used by at least one of the applications 1320, other components, or layers. The libraries 1316 provide functionality that allows other software components to perform tasks in an easier fashion than to interface directly with the underlying operating system 1314 functionality (e.g., kernel 1328, services 1330, drivers 1332). The libraries 1316 may include system libraries 1334 (e.g., C standard library) that may provide functions such as memory allocation functions, string manipulation functions, mathematical functions, and the like. In addition, the libraries 1316 may include API libraries 1336 such as media libraries (e.g., libraries to support presentation and manipulation of various media format such as MPEG4, H.264, MP3, AAC, AMR, JPG-, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks/middleware 1318 (also sometimes referred to as middleware) provide a higher-level common infrastructure that may be used by the applications 1320 or other software components/modules. For example, the frameworks/middleware 1318 may provide various graphical user interface functions, high-level resource management, high-level location services, and so forth. The frameworks/middleware 1318 may provide a broad spectrum of other APIs that may be utilized by the applications 1320 or other software components/modules, some of which may be specific to a particular operating system 1314 or platform.

The applications 1320 include built-in applications 1340 and third-party applications 1342. Examples of representative built-in applications 1340 may include, but are not limited to, a contacts application, a browser application, a book reader application, a location application, a media application, a messaging application, or a game application. Third-party applications 1342 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1342 may invoke the API calls 1324 provided by the mobile operating system (such as operating system 1314) to facilitate functionality described herein.

The applications 1320 may use built-in operating system functions (e.g., kernel 1328, services 1330, drivers 1332), libraries 1316, and frameworks/middleware 1318 to create Ins to interact with users of the system. Alternatively, or additionally, in some systems, interactions with a user may occur through a presentation layer, such as presentation layer 1322. In these systems, the application/component "logic" can be separated from the aspects of the application/component that interact with a user.

Glossary:

"CARRIER SIGNAL," in this context, refers to any intangible medium that is capable of storing, encoding, or carrying transitory or non-transitory instructions 1202 for execution by the machine 1200, and includes digital or analog communications signals or other intangible medium to facilitate communication of such instructions 1202. Instructions 1202 may be transmitted or received over the network 114, 1234 using a transitory or non-transitory transmission medium via a network interface device and using any one of a number of well-known transfer protocols.

"CLIENT DEVICE," in this context, refers to any machine 1200 that interfaces to a communications network 114, 1234 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 114, 1234.

"COMMUNICATIONS NETWORK," in this context, refers to one or more portions of a network 114, 1234 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 114, 1234 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"MACHINE-READABLE MEDIUM," in this context, refers to a component, device, or other tangible media able to store instructions 1202 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" may be taken to include a single medium or multiple media (e.g., a centralized or distributed database, or associated caches and servers) able to store instructions 1202. The term "machine-readable medium" shall also be taken to include any medium, or combination of multiple media, that is capable of storing instructions 1202 (e.g., code) for execution by a machine 1200, such that the instructions 1202, when executed by one or more processors 1204 of the machine 1200, cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components, A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1204 or other programmable processor. Once configured by such software, hardware components become specific machines (or specific components of a machine 1200) uniquely tailored to perform the configured functions and are no longer general-purpose processors 1204. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 1204 configured by software to become a special-purpose processor, the general-purpose processor 1204 may be configured as respectively different special-purpose processors (e.g., comprising different hardware components) at different times. Software accordingly configures a particular processor 1212, 1214 or processors 1204, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1204 that are temporarily configured (e.g., by software) car permanently configured to perform the relevant operations. Whether temporarily or permanently configured, such processors 1204 may constitute processor-implemented components that operate to perform one or more operations or functions described herein. As used herein, "processor-implemented component" refers to a hardware component implemented using one or more processors 1204. Similarly, the methods described herein may be at least partially processor-implemented, with a particular processor 1212, 1214 or processors 1204 being an example of hardware. For example, at least some of the operations of a method may be performed by one or more processors 1204 or processor-implemented components. Moreover, the one or more processors 1204 may also operate to support performance of the relevant operations in a "cloud computing" environment or as a "software as a service" (SaaS). For example, at least some of the operations may be performed by a group of computers (as examples of machines 1000 including processors 1204), with these operations being accessible via a network 114 (e.g., the Internet) and via one or more appropriate interfaces (e.g., an API). The performance of certain of the operations may be distributed among the processors, not only residing within a single machine 1200, but deployed across a number of machines. In some example implementations, the processors 1204 or processor-implemented components may be located in a single geographic location (e.g., within a home environment, an office environment, or a server farm). In other example implementations, the processors 1204 or processor-implemented components may be distributed across a number of geographic locations.

"PROCESSOR," in this context, refers to any circuit or virtual circuit (a physical circuit emulated by logic executing on an actual processor 1204) that manipulates data values according to control signals (e.g., "commands," "op codes," "machine code," etc.) and which produces corresponding output signals that are applied to operate a machine 1200. A processor 1204 may, for example, be a CPU, a RISC processor, a CISC processor, a GPU, a DSP, an ASIC, a RFIC or any combination thereof. A processor 1204 may further be a multi-core processor having two or more independent processors 1204 (sometimes referred to as "cores") that may execute instructions 1202 contemporaneously.

"TIMESTAMP." in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:

1. A method comprising:

causing, by one or more computing devices having one or more processors and memory, a camera user interface to be displayed on a display device, the camera user interface including a region that includes content captured by one or more cameras;

receiving, by at least one computing device of the one or more computing devices, input data indicating input captured by one or more input devices with respect to the camera user interface;

determining, by at least one computing device of the one or more computing devices, that the input data corresponds to navigating from the camera user interface to an application resources user interface related to accessing third-party resources;

generating, by at least one computing device of the one or more computing devices, user interface data that corresponds to the application resources user interface, the user interface data indicating that the application resources user interface includes:

a first region that includes one or more user interface elements, individual user interface elements of the one or more user interface elements being selectable to access a respective third-party resource;

a second region that includes a partial view of the content included in the region of the camera user interface and is moved downward with respect to the region of the camera user interface such that the second region is below the first region; and a third region having one or more notifications that correspond to additional content accessible using a client application, the third region being located below the first region and above the second region;

analyzing usage data for a user of the client application with respect to third-party resources to determine the additional content related to the one or more notifications; and causing, by at least one computing device of the one or more computing devices, the application resources user interface to be displayed on the display device based on the user interface data.

2. The method of claim 1, further comprising:
executing, by at least one computing device of the one or more computing devices, an instance of a client application, wherein the camera user interface and the application resources user interface are displayed in conjunction with the client application; and
executing, by at least one computing device of the one or more computing devices, one or more features of a third-party resource within the instance of the client application.

3. The method of claim 1, comprising:
obtaining, by at least one computing device of the one or more computing devices, first additional input indicating a modification to the application resources user interface by at least one of adding a user interface element corresponding to a third-party resource, removing the user interface element corresponding to the third-party resource, or moving the user interface element that corresponds to the third-party resource to a different location in the application resources user interface; and
obtaining, by at least one computing device of the one or more computing devices, second additional input after the first additional input, the second additional input to remove the partial view of the camera user interface and return to a full view of the camera user interface.

4. The method of claim 1, further comprising:
receiving, by at least one computing device of the one or more computing devices, additional input data indicating additional input captured by the one or more input devices with respect to the application resources user interface;
determining, by at least one computing device of the one or more computing devices, that the additional input data corresponds to selection of a user interface element of the one or more user interface elements of the application resources user interface; and
launching, by at least one computing device of the one or more computing devices, an instance of a third-party resource that corresponds to the user interface element from the application resources user interface.

5. The method of claim 1, wherein:
the input data indicates a downward swiping motion with respect to the camera user interface; and
the camera user interface is displayed in conjunction with an instance of a client application executed by a client device and the camera user interface displays a live view of a camera of the client device.

6. The method of claim 1, wherein a first amount of area occupied by the first region is greater than a second amount of area occupied by the second region.

7. The method of claim 1, further comprising:
receiving, by at least one computing device of the one or more computing devices, additional input data indicating additional input captured by the one or more input devices with respect to the application resources user interface;
determining, by at least one computing device of the one or more computing devices, that the additional input data corresponds to modifying one or more third-party resources associated with a user account of a client application from which the one or more third-party resources are accessible; and
modifying, by at least one computing device of the one or more computing devices, an arrangement of the one or more user interface elements within the first region in response to the additional input data.

8. The method of claim 7, further comprising:
determining, by at least one computing device of the one or more computing devices, that the additional input data corresponds to a press and hold gesture followed by a dragging gesture, the dragging gesture being directed to a user interface element of the one or more user interface elements;
generating, by at least one computing device of the one or more computing devices, a modified version of the application resources user interface in response to at least one of the press and hold gesture or the dragging gesture; and
causing, by at least one computing device of the one or more computing devices, the modified version of the application resources user interface to be displayed on the display device such that the second region including at least a portion of the camera user interface and the third region are removed from the application resources user interface is removed.

9. The method of claim 8, further comprising:
determining, by at least one computing device of the one or more computing devices, that the additional input to modify the one or more third-party resources associated with the user account is completed;
generating, by at least one computing device of the one or more computing devices, an additional modified version of the application resources user interface in response to determining that the additional input to modify the one or more third-party resources associated with the user account is completed; and
causing, by at least one computing device of the one or more computing devices, the additional modified version of the application resources user interface to be displayed on the display device such that the second region including the at least a portion of the camera user interface and the third region are returned to being displayed in the application resources user interface.

10. The method of claim 7, wherein:
the first region of the application resources user interface includes a first sub-region and a second sub-region, the first sub-region including a user interface element that corresponds to a recommended third-party resource and the second sub-region being configured to display at least one user interface element that corresponds to at least one third-party resource associated with the user account;
the additional input includes dragging the user interface element from the first sub-region to the second sub-region, and
the method further comprises adding, by at least one computing device of the one or more computing devices, the recommended third-party resource to the user account.

11. The method of claim 7, wherein:
the application resources user interface includes an additional user interface element that corresponds to removal of at least one third-party resource from user accounts;
the additional input includes dragging a user interface element of the one or more user interface elements displayed in the application resources user interface to cover at least a portion of the additional user interface element; and the method further comprises removing, by at least one computing device of the one or more computing devices, a third-party resource corresponding to the user interface element from the user account.

12. The method of claim 1, further comprising:
receiving, by at least one computing device of the one or more computing devices, additional input data indicating additional input captured by the one or more input devices with respect to the application resources user interface;
determining, by at least one computing device of the one or more computing devices, that the additional input data corresponds to one or more search terms with respect to the third-party resources;
causing, by at least one computing device of the one or more computing devices, a modified version of the application resources user interface to be displayed that includes a user interface element corresponding to a third-party resource that is returned in response to the one or more search terms;
receiving, by at least one computing device of the one or more computing devices, further input data indicating further input captured by the one or more input devices with respect to the modified version of the application resources user interface, the further input including dragging the user interface element to a portion of the first region that is configured to display at least one user interface element that corresponds to at least one third-party resource associated with a user account; and
adding, by at least one computing device of the one or more computing devices, the third-party resource to the user account.

13. A system comprising:
one or more hardware processors; and
one or more non-transitory computer-readable storage media including computer-readable instructions that, when executed by the one or more hardware processors, cause the one or more hardware processors to perform operations comprising:
causing a camera user interface to be displayed on a display device, the camera user interface including a region that includes content captured by one or more cameras;
receiving input data indicating input captured by one or more input devices with respect to the camera user interface;
determining that the input data corresponds to navigating from the camera user interface to an application resources user interface related to accessing third-party resources;
generating user interface data that corresponds to the application resources user interface, the user interface data indicating that the application resources user interface includes:
a first region that includes one or more user interface elements, individual user interface elements of the one or more user interface elements being selectable to access a respective third-party resource;
a second region that includes a partial view of the content included in the region of the camera user interface and is moved downward with respect to the region of the camera user interface such that the second region is below the first region; and
a third region having one or more notifications that correspond to additional content accessible using a client application, the third region being located below the first region and above the second region;
analyzing usage data for a user of the client application with respect to third-party resources to determine the additional content related to the one or more notifications; and
causing the application resources user interface to be displayed on the display device based on the user interface data.

14. The system of claim 13, wherein the one or more non-transitory computer-readable storage media include additional computer-readable instructions that, when executed by the one or more hardware processors, cause the one or more hardware processors to perform additional operations comprising:
receiving additional input data indicating additional input captured by the one or more input devices with respect to the application resources user interface;
determining that the additional input data corresponds to selection of a user interface element of the one or more user interface elements of the application resources user interface, the user interface element correspond to a third-party resource;
obtaining, in response to the additional input data, one or more hypertext markup language (HTML) documents from a third-party system related to the third-party resource; and
executing one or more features of the third-party resource using the one or more HTML documents.

15. The system of claim 13, wherein:
the first region of the application resources user interface includes a first sub-region and a second sub-region, the first sub-region including a first group of user interface elements and the second sub-region including a second group of user interface elements, the first group of user interface elements being different from the second group of user interface elements;
the first group of user interface elements corresponds to a first number of third-party resources and the second group of user interface elements corresponds to a second number of third-party resources; and
the one or more non-transitory computer-readable storage media include additional computer-readable instructions that, when executed by the one or more hardware processors, cause the one or more hardware processors to perform additional operations comprising:
determining a first arrangement of the first group of user interface elements within the first sub-region; and
determining a second arrangement of the second group of user interface elements within the second sub-region.

16. The system of claim 15, wherein the one or more non-transitory computer-readable storage media include additional computer-readable instructions that, when executed by the one or more hardware processors, cause the one or more hardware processors to perform additional operations comprising:
analyzing usage data with respect to the first number of third-party resources to determine the first arrangement, the first arrangement indicating a first order in which to display the first group of user interface elements; and
determining the second arrangement based on additional user input indicating placement of the second group of user interface elements within the second sub-region of the first region of the application resources user interface.

17. The system of claim 16, wherein:
the usage data indicates frequency of use by one or more first users of a client application that implements features of the third-party resources or recency of use by one or more second users of the client application;
the one or more non-transitory computer-readable storage media include additional computer-readable instructions that, when executed by the one or more hardware processors, cause the one or more hardware processors to perform additional operations comprising:
obtaining the usage data from a server system that monitors use of the third-party resources by users of the client application.

18. A method comprising:
obtaining, by one or more computing devices having one or more processors and memory, usage data indicating usage of features of a client application by users of the client application, the features of the client application including third-party resources that are executed within the client application;
determining, by at least one computing device of the one or more computing devices, a plurality of third-party resources that correspond to an account of a user of the client application, the account being related to the client application;
analyzing, by at least one computing device of the one or more computing devices, the usage data to determine an amount of usage of the plurality of third-party resources by the user of the client application;
determining, by at least one computing device of the one or more computing devices, an arrangement of a plurality of user interface elements within an application resources user interface based on the usage data, the application resources user interface being configured to be displayed in conjunction with the client application and individual user interface elements of the plurality of user interface elements being displayed in a first region of the application resources user interface and corresponding to an individual third-party resource of the plurality of third-party resources; and
sending, by at least one computing device of the one or more computing devices, user interface data to a client device of the user of the client application, the user interface data being configured to cause the client device to display the plurality of user interface elements within the application resources user interface according to the arrangement, to display in a second region of the application resources user interface a partial view of content included in a camera user interface that is related to the client application, and to display in a third region of the application resources user interface one or more notifications that correspond to additional content accessible using a client application,
wherein the second region is displayed below the first region in the application resources user interface, the third region is located below the first region and above the second region, and the additional content related to the one or more notifications is based on the usage data.

19. The method of claim 18, further comprising:
analyzing, by at least one computing device of the one or more computing devices, the usage data with respect to usage of a number of third-party resources to determine an amount of usage by users of the client application with respect to a number of third-party resources;
determining, by at least one computing device of the one or more computing devices, a respective ranking for each of the number of third-party resources;
determining, by at least one computing device of the one or more computing devices, a recommendation for the user of the client application corresponding to a third-party resource of the number of third-party resources, wherein the recommendation is based on the respective ranking of the third-party resource in relation to additional respective rankings of additional third-party resources of the number of third-party resources; and
sending, by at least one computing device of the one or more computing devices, additional user interface data to the client device of the user of the client application, the additional user interface data indicating an additional user interface element that corresponds to the third-party resource, the additional user interface element being configured to be displayed within the application resources user interface.

20. The method of claim 18, further comprising:
analyzing, by at least one computing device of the one or more computing devices, characteristics of the user of the client application with respect to additional characteristics of additional users of the client application;
determining, by at least one computing device of the one or more computing devices, that one or more additional characteristics of an additional user of the client application have at least a threshold amount of similarity with respect to one or more characteristics of the user of the client application;
analyzing, by at least one computing device of the one or more computing devices, the usage data with respect to one or more third-party resources associated with an additional account of the additional user with the client application;
determining, by at least one computing device of the one or more computing devices, a recommendation for the user of the client application corresponding to a third-party resource of the one or more third-party resources, wherein the recommendation is determined based on an amount of usage of the third-party resource by the additional user of the client application; and
sending, by at least one computing device of the one or more computing devices, additional user interface data to the client device of the user of the client application, the additional user interface data indicating an additional user interface element that corresponds to the third-party resource, the additional user interface element being configured to be displayed within the application resources user interface.

* * * * *